US012439848B2

(12) United States Patent
Gaedy et al.

(10) Patent No.: US 12,439,848 B2
(45) Date of Patent: Oct. 14, 2025

(54) GROUND WORKING VEHICLE WITH ADJUSTABLE IMPLEMENT

(71) Applicant: THE TORO COMPANY, Bloomington, MN (US)

(72) Inventors: Merle W. Gaedy, Roseville, MN (US); Clark S. Papke, Cortland, NE (US); Peter M. Arendt, Richfield, MN (US)

(73) Assignee: THE TORO COMPANY, Bloomington, MN (US)

( * ) Notice: Subject to any disclaimer, the term of this patent is extended or adjusted under 35 U.S.C. 154(b) by 82 days.

(21) Appl. No.: 18/568,107

(22) PCT Filed: Jun. 15, 2022

(86) PCT No.: PCT/US2022/033591
§ 371 (c)(1),
(2) Date: Dec. 7, 2023

(87) PCT Pub. No.: WO2022/266198
PCT Pub. Date: Dec. 22, 2022

(65) Prior Publication Data
US 2024/0268262 A1    Aug. 15, 2024

Related U.S. Application Data

(60) Provisional application No. 63/211,407, filed on Jun. 16, 2021.

(51) Int. Cl.
*A01D 34/74*    (2006.01)
*A01D 34/00*    (2006.01)
(Continued)

(52) U.S. Cl.
CPC ........... *A01D 34/74* (2013.01); *A01D 34/006* (2013.01); *A01D 34/64* (2013.01); *A01D 34/78* (2013.01)

(58) Field of Classification Search
CPC ...... A01D 34/74; A01D 34/006; A01D 34/64; A01D 34/78
(Continued)

(56) References Cited

U.S. PATENT DOCUMENTS 4,869,057 A    9/1989 Siegrist
4,942,726 A    7/1990 Bowditch
(Continued)

FOREIGN PATENT DOCUMENTS

CN    2 039 68680 U    12/2014
GB         2553182 A     2/2018
(Continued)

OTHER PUBLICATIONS

U.S. Appl. No. 63/211,407, filed Jun. 16, 2021, Gaedy et al.
(Continued)

*Primary Examiner* — Kambiz Abdi
(74) *Attorney, Agent, or Firm* — Mueting Raasch Group

(57) ABSTRACT

A ground working vehicle having a vehicle frame (102) is disclosed. An implement (114) is coupled to the vehicle frame (102) and extends between a first implement end and a second implement end. The implement (114) is adjusted to alter the rake angle between the first and second implement ends, to modify internal dimensions of the implement (114), and/or to include a kick-down baffle. Further, the implement (114) may be adjusted manually, remotely, or automatically. For example, one or more actuators (150) can be coupled to the implement (114) to adjust as desired by the user. Further, one or controllers (152) can automatically adjust the implement (114). Specifically, the implement (114) is adjusted to optimize operating parameters such as, e.g., runtime of the vehicle and/or quality of cut.

13 Claims, 16 Drawing Sheets

(51) Int. Cl.
   *A01D 34/64* (2006.01)
   *A01D 34/78* (2006.01)
(58) Field of Classification Search
   USPC .......................................................... 701/35
   See application file for complete search history.

(56) References Cited

U.S. PATENT DOCUMENTS

| | | | |
|---|---|---|---|
| 5,388,176 | A | 2/1995 | Dykstra et al. |
| 5,906,088 | A | 5/1999 | Inui et al. |
| 5,937,622 | A | 8/1999 | Carrier et al. |
| 5,987,863 | A | 11/1999 | Busboom et al. |
| 6,085,508 | A | 7/2000 | Miatt et al. |
| 6,105,348 | A | 8/2000 | Turk et al. |
| 6,195,969 | B1 | 3/2001 | Yilmaz |
| 6,347,503 | B1 | 2/2002 | Esau et al. |
| 6,354,678 | B1 | 3/2002 | Oertley |
| 6,442,917 | B1* | 9/2002 | Velke .................. A01D 34/6806 56/14.7 |
| 6,554,082 | B2 | 4/2003 | Bischel et al. |
| 6,750,622 | B2 | 6/2004 | Simizu et al. |
| 6,892,519 | B2 | 5/2005 | Sugden et al. |
| 6,996,962 | B1 | 2/2006 | Sugden et al. |
| 7,028,456 | B2 | 4/2006 | Thatcher et al. |
| 7,093,415 | B2 | 8/2006 | Kallevig et al. |
| 7,594,377 | B1 | 9/2009 | Jansen et al. |
| 7,823,373 | B1 | 11/2010 | Loxterkamp et al. |
| 7,861,502 | B1 | 1/2011 | Benway |
| 7,930,813 | B2 | 4/2011 | Melone et al. |
| 9,301,444 | B2 | 4/2016 | Campbell et al. |
| 9,629,307 | B2 | 4/2017 | Gaeddert et al. |
| 10,058,031 | B1* | 8/2018 | Brown .................. B60K 7/0007 |
| 10,524,418 | B1 | 1/2020 | Wright |
| 11,533,842 | B2* | 12/2022 | Fredenburg ............ A01D 34/74 |
| 11,618,324 | B2 | 4/2023 | Sosnowski et al. |
| 11,910,748 | B2* | 2/2024 | Anderson ............ A01D 34/667 |
| 12,321,872 | B1* | 6/2025 | Richey .................. G06Q 10/047 |
| 2005/0193699 | A1 | 9/2005 | Hatfield |
| 2005/0268588 | A1 | 12/2005 | Winter et al. |
| 2007/0012016 | A1 | 1/2007 | Strope |
| 2009/0249764 | A1 | 10/2009 | Butler et al. |
| 2012/0228041 | A1 | 9/2012 | Borinato |
| 2013/0280111 | A1 | 10/2013 | Hoxie et al. |
| 2014/0165523 | A1* | 6/2014 | Schygge ................ B60L 50/66 701/33.9 |
| 2014/0260161 | A1 | 9/2014 | Lancaster |
| 2015/0006010 | A1 | 1/2015 | Ito |
| 2016/0207418 | A1 | 7/2016 | Bergstrom et al. |
| 2016/0363933 | A1 | 12/2016 | Balutis |
| 2017/0099770 | A1 | 4/2017 | Badovinac, II |
| 2017/0245436 | A1* | 8/2017 | Kuriyagawa ...... A01D 43/0631 |
| 2018/0195595 | A1 | 7/2018 | Huang |
| 2020/0023740 | A1 | 1/2020 | Bystedt |
| 2020/0113133 | A1 | 4/2020 | Zeiler et al. |
| 2021/0105938 | A1* | 4/2021 | Fredenburg .......... A01D 34/283 |
| 2021/0227745 | A1 | 7/2021 | Fredenburg et al. |
| 2022/0095537 | A1 | 3/2022 | Rukamp et al. |
| 2023/0105559 | A1* | 4/2023 | Wang ..................... B60L 58/10 180/68.5 |
| 2024/0208521 | A1* | 6/2024 | Arendt .................. B60W 50/12 |
| 2024/0268262 | A1* | 8/2024 | Gaedy .................. A01D 34/006 |
| 2024/0397860 | A1* | 12/2024 | Fredenburg ............ A01D 34/74 |

FOREIGN PATENT DOCUMENTS

| | | | |
|---|---|---|---|
| WO | WO 2014/119885 | A1 | 8/2014 |
| WO | WO 2018/031652 | A1 | 2/2018 |
| WO | WO 2020/214925 | A1 | 10/2020 |
| WO | WO 2022/266198 | A1 | 12/2022 |

OTHER PUBLICATIONS

International Search Report and Written Opinion issued Dec. 7, 2022, for International Patent Application No. PCT/US2022/033591, filed Jun. 15, 2022; 20 pages.

"Invitation to Pay Additional Fees and, Where Applicable, Protest Fee" issued Oct. 13, 2022, for International Patent Application No. PCT/US2022/033591, filed Jun. 15, 2022; 11 pages.

"Invitation to Restrict or Pay Additional Fees, and, Where Applicable, Protest Fee" issued Jun. 14, 2023, for International Patent Application No. PCT/US2022/033591, filed Jun. 15, 2022; 4 pages.

International Preliminary Report on Patentability, issued Sep. 25, 2023, for International Patent Application No. PCT/US2022/033591, filed Jun. 15, 2022; 10 pages.

NPL Document 1, Screen capture from YouTube video clip entitled "What your mower dealer isn't telling you . . . Deck Baffles!! SS Lawn Care." Uploaded on Aug. 22, 2016, by user Southern Style Lawn Care. [Retrieved on Jul. 8, 2024]. Retrieved from the Internet: < https://www.youtube.com/watch?v=hxbWIozWTzM>; 1 Page.

"Groundmaster 5900/5910 Large Area Rotary Mowers" Brochure, The Toro Company, Bloomington, MN, USA, 2017; 4 Pages.

\* cited by examiner

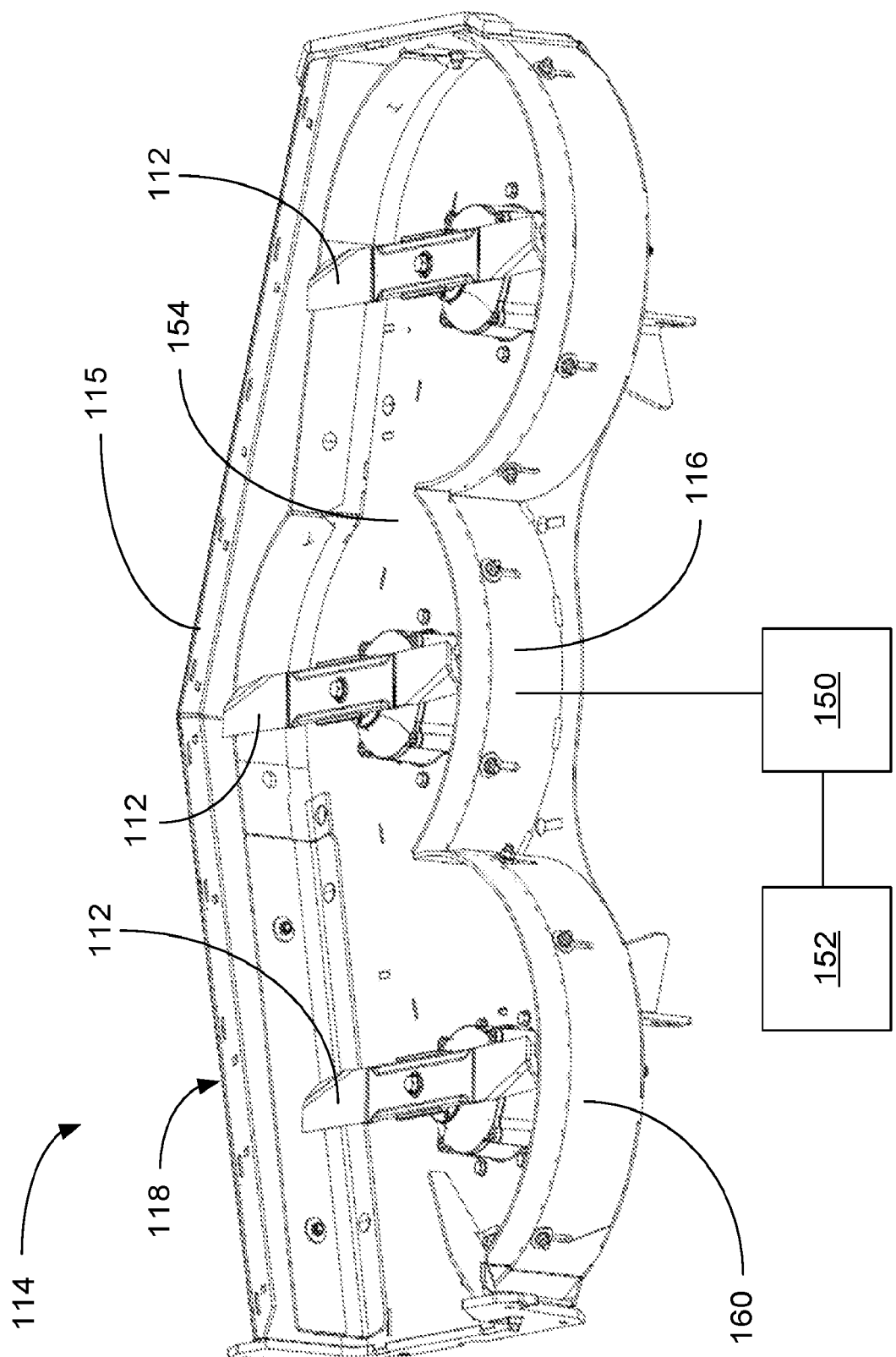

GROUND WORKING VEHICLE WITH ADJUSTABLE IMPLEMENT

The present application is the § 371 U.S. National Stage of International Application No. PCT/US2022/033591, filed Jun. 15, 2022, which claims priority to and/or the benefit of U.S. Provisional Patent Application No. 63/211,407, filed Jun. 16, 2021, the disclosures of which are incorporated herein by reference in their entireties.

Embodiments of the present disclosure are directed to ground working vehicles such as stand-on or walk-behind lawn mowers and, more particularly, to such vehicles incorporating adjustable implement decks.

BACKGROUND

Riding and walk-behind ground working vehicles such as lawn mowers, aerators, spreaders/sprayers, and the like are used by homeowners and professionals alike to care for lawns and other surfaces. These vehicles typically include a prime mover, e.g., internal combustion engine or electric motor, to power not only an implement (e.g., cutting deck) attached to the vehicle, but also a traction drive system, the latter adapted to propel the vehicle over a ground surface.

The implement of the vehicle may be secured to a frame of the vehicle and the height of which may be adjustable relative to the frame and the ground. Some designs provide for manual adjustment of the height of the implement relative to the vehicle frame such as by a manually-adjustable position fastener associated with the implement that abuts the frame to set the desired height. The implement's weight exerts a force on the position fastener to, at least in part, secure the connection.

In addition to adjusting the height of the implement, it can also be desirable to adjust the angle of the implement relative to the ground. However, adjusting the implement angle can be a relatively cumbersome process. In some designs, it can take multiple people to adjust the implement angle at multiple attachment points. In some designs, adjusting the implement angle can require various tools and take a relatively significant amount of time. For some implements such as a grass cutting deck, it is important to adjust the angle of the cutting deck with the front leading edge of the blades either higher or lower than the back trailing edge of the blades. Depending on the angle of the implement, the amount of energy used and quality of cut may change. Therefore, adjusting the angle of the implement may help to optimize energy use and quality of cut. Further, the internal dimensions of the implement may be adjusted to also change the amount of energy used and the quality of cut.

SUMMARY

Embodiments of the present disclosure may provide a ground working vehicle that includes a vehicle frame and an implement coupled to the vehicle frame. The implement may extend between a first implement end and a second implement end along a longitudinal axis. The vehicle may also include an implement angle selection tool configured to change an elevation of the second implement end relative to the first implement end and fix the elevation of the second implement end relative to the first implement end. The implement angle selection tool may include an angle lever and a stopper. The angle lever may be pivotally attached to the vehicle frame and connected to a portion of the implement proximate the second implement end. The angle lever may be configured to be pivoted to adjust the elevation of the second implement end relative to the first implement end. The stopper may be positionable proximate the angle lever to restrict pivoting movement of the angle lever in at least one rotational direction. The vehicle may also include a height selection tool configured to select one vertical position of a plurality of selectable vertical positions. Each vertical position may limit a distance between the implement and a ground surface. The elevation of the second implement end relative to the first implement end may be maintained at each of the vertical positions.

Another embodiment of the present disclosure may provide a ground working vehicle that includes a vehicle frame and an implement coupled to the vehicle frame. The implement may extend between a first implement end and a second implement end along a longitudinal axis. The implement may include a housing defining a chamber. The housing may include an upper plate and a baffle extending from the upper plate proximate the second implement end. The baffle may include a first plate movably coupled to the upper plate and a second plate movably coupled to the first plate. At least one of the first plate may be configured to move relative to the upper plate along a direction parallel to the longitudinal axis and the second plate may be configured to move relative to the first plate along a direction perpendicular to the longitudinal axis.

Yet another embodiment of the present disclosure may provide a ground working vehicle that includes a vehicle frame and an implement coupled to the vehicle frame. The implement may extend between a first implement end and a second implement end along a longitudinal axis. The implement may include a housing defining a chamber. The housing may include an upper plate and a baffle extending from the upper plate proximate the second implement end. The vehicle may also include a plurality of cutting blades disposed within the housing and a controller configured to do one or more of the following based on a torque of the plurality of cutting blades: (1) automatically adjust the elevation of the second implement end relative to the first implement end, (2) automatically adjust a minimum distance between the baffle and a blade tip circle of the plurality of cutting blades, and (3) automatically adjust a minimum distance between the baffle and a ground surface.

Another embodiment of the present disclosure may provide a ground working vehicle that includes a vehicle frame and an implement coupled to the vehicle frame. The implement may extend between a first implement end and a second implement end along a longitudinal axis. The implement may include a housing defining a chamber. The housing may include an upper plate. The vehicle may also include a plurality of cutting blades disposed within the housing and one or more kick-down baffles. Each kick-down baffle of the one or more kick-down baffles may correspond to a cutting blade of the plurality of cutting blades. The kick-down baffle may be adapted to pivot to a position between the corresponding cutting blade and the upper plate.

Another embodiment of the present disclosure may provide a method of optimizing an operating parameter of a ground working vehicle. The method may include estimating the operating parameter of the ground working vehicle based on a current stored energy level and energy consumption data. The ground working vehicle may include a vehicle frame and an implement coupled to the vehicle frame. The implement may extend between a first implement end and a second implement end along a longitudinal axis. The method may also include comparing estimated operating parameter to a desired operating parameter and adjusting rake angle of the implement or baffle position of the implement to modify the energy consumption data. The rake angle may be defined by an elevation of the second implement end relative to the first implement end. The baffle may be located proximate the second implement end.

Another embodiment of the present disclosure may provide a ground working vehicle that includes a vehicle frame and an implement coupled to the vehicle frame. The implement may extend between a first implement end and a second implement end along a longitudinal axis. The vehicle may also include one or more actuators and a controller. The one or more actuators may be adapted to change an elevation of the second implement end relative to the first implement end and fix the elevation of the second implement end relative to the first implement end, and/or change the position of a baffle of the implement. The controller may be adapted to estimate runtime of the ground working vehicle based on a current stored energy level and energy consumption data, compare estimate runtime to a desired runtime, and adjust one or both of: (1) the elevation of the second implement end relative to the first implement end via the one or more actuators to modify the energy consumption data, and (2) the baffle position of the implement.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein:

FIG. 5A is a perspective view of the adjustable implement of FIG. 4B;

Figure 1:
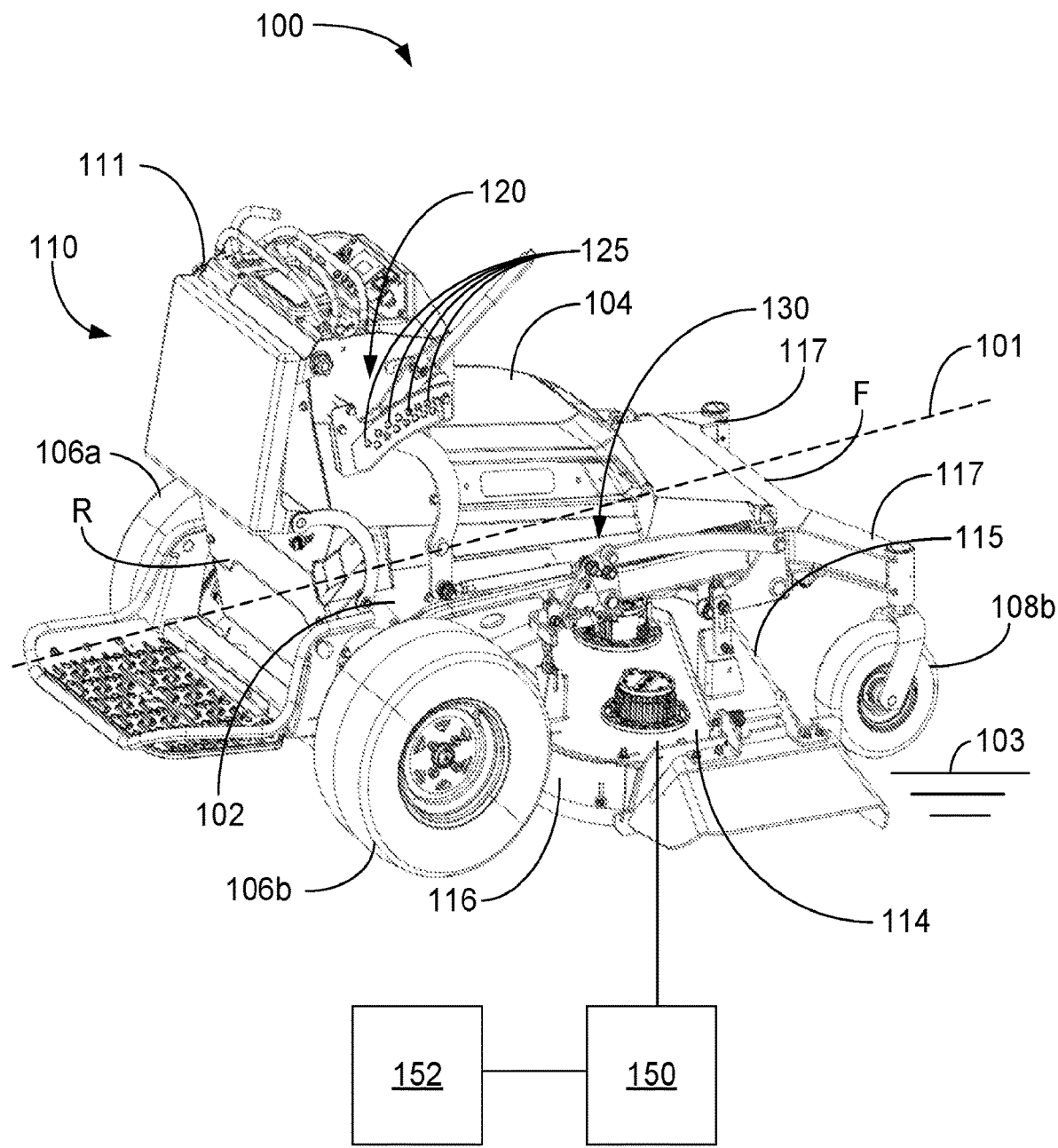
FIG. 1 is a right rear perspective view of a ground working vehicle, e.g., a stand-on mower, with an implement angle selection tool in accordance with embodiments of the present disclosure.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about." Furthermore, the terms "having," "including," "comprises" and variations thereof do not have a limiting meaning where these terms appear in this description and claims, and the terms "a," "an," "the," "at least one," and "one or more" are used interchangeably herein. The term "and/or" (if used) means one or all of the listed elements or a combination of any two or more of the listed elements. "I.e." is used as an abbreviation for the Latin phrase id est, and means "that is." "E.g.," is used as an abbreviation for Latin phrase exempli gratia, and means "for example."

Still further, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective of one operating the mower 100 while the mower is in an operating configuration, e.g., while it is positioned such that ground engaging members (e.g., wheels) rest upon a generally horizontal ground surface 103 as shown in FIG. 1. These terms are used only to simplify the description, however, and not to limit the interpretation of any embodiment described.

Embodiments described and illustrated herein are directed to powered (e.g., self-propelled) ground working vehicles (e.g., a grounds maintenance vehicle) incorporating an implement (e.g., a cutting deck) that may be adjusted as desired. For example, the implement may be adjusted in various ways to optimize an operating parameter of the ground working vehicles. Specifically, the operating parameter may include various parameters of the ground working vehicles that may be affected by changes to the vehicle and optimized such as, e.g., energy usage, runtime, quality of cut, etc. Energy usage may be defined as the depletion of an energy source (e.g., fossil fuels, battery, etc.), runtime may be defined as the amount of usage time before the energy source is depleted, and the quality of cut may be defined as whether all the grass was cut level and the after cut appearance (e.g., grass dispersion).

The implement may be adjusted through a modification of a rake angle (e.g., the angle at which the implement lies relative to the ground surface), the position of an implement baffle, the position of a kick-down ramp baffle, etc. The arrangement and orientation of the implement may affect the torque applied to the motor of the vehicle due to the number of clippings accumulating within the implement cavity. Increasing the torque applied to the motor of the vehicle may result in an increased power demand and, therefore, may decrease overall runtime and improve quality of cut. However, an arrangement and orientation of the implement that decreases the torque applied to the motor of the vehicle may result in increased overall runtime, but may also result in a worse quality of cut. As such, there may be a balance between energy usage (e.g., power demand) and quality of cut that may be determined based on a desired operating parameter (e.g., desired overall runtime, desired quality of cut, etc.) In other words, the arrangement and orientation of the implement may be modified to optimize the quality of cut for a specific job or optimize the desired overall runtime needed for a specific job. Further, other conditions of the turf (e.g., moisture, lush or sparse, length, type, overall height, amount being cut off, etc.) may factor into the amount of torque applied to the cutting blade motor and the quality of cut. Further yet, these conditions may be predicted based on seasonality factors attributed to the turf (e.g., turf may grow faster in Springtime due to increased rain).

Arranging and orienting the implement may be accomplished manually or automatically. For example, in one or more embodiments, the implement may include various elements or features that can be manually manipulated to adjust the implement. In other embodiments, the vehicle may include one or more actuators and one or more controllers to automatically adjust the implement. Specifically, the user may provide inputs (e.g., adjustment instructions) to the controller to adjust the implement via the actuators, the user may provide inputs (e.g., desired operating parameters) into an algorithm of the controller to determines the adjustments of the implement, and/or the controller may use data (e.g., historical data, environmental data, etc.) and self-learning to determine the adjustments of the implement.

With reference to the figures of the drawing, wherein like reference numerals designate like parts and assemblies throughout the several views, FIG. 1 illustrates a self-propelled vehicle, e.g., a mid-mount lawn mower 100, including an implement 114 having an implement angle selection tool 130. While, for the sake of brevity, embodiments of the disclosure are herein described with reference to a mid-mount stand-on mower (hereinafter generically referred to simply as a "mower"), those of skill in the art will realize that the concepts described herein are equally applicable to other types of walk-behind and stand-on mowers including an implement, as well as to almost any other walk-behind, or stand-on, ground working vehicle having a ground engaging implement.

It is noted that the suffixes "a" and "b" may be used throughout this description to denote various left- and right-side parts/features, respectively. However, in most pertinent respects, the parts/features denoted with "a" and "b" suffixes are substantially identical to, or mirror images of, one another. It is understood that, unless otherwise noted, the description of an individual part/feature (e.g., part/feature identified with an "a" suffix) also applies to the opposing part/feature (e.g., part/feature identified with a "b" suffix). Similarly, the description of a part/feature identified with no suffix may apply, unless noted otherwise, to both the corresponding left and right part/feature.

While not necessarily central to an understanding of exemplary embodiments of the present disclosure (e.g., other mower and other vehicle configurations are certainly contemplated), the general construction of the illustrative mower 100 is briefly described below. FIG. 1 illustrates the mower 100 including a frame or chassis 102 having a front end F and a rear end R (and a longitudinal axis 101 extending between the front and rear ends), the chassis 102 supporting a power source or prime mover 104, e.g., internal combustion engine or electric motor. A pair of transversely opposing, ground engaging members, e.g., first and second (left and right) rear drive wheels 106a and 106b, may be coupled to opposite (left and right) rear sides of the chassis 102 to support the mower upon, and propel the mower 100 relative to, the ground surface 103. Each drive wheel 106 may be powered by its own hydraulic motor that receives power from, at least in one embodiment, its own hydrostatic pump. Other drive systems, e.g., gear or pulley driven systems, may also be utilized by the mower 100.

Operator controls, as further described below, permit independent control of the speed and direction of each drive wheel 106, allowing operator control of mower 100 speed and direction from a walking or riding (e.g., standing) position generally behind the mower 100. A pair of front ground engaging members (e.g., left and right caster wheels 108a, 108b), which may be connected to forwardly extending frame rails 117, may support the front of the mower 100 in rolling engagement with the ground surface 103.

Although the illustrated mower 100 has the drive wheels 106 in the rear and caster wheels 108 in front, this configuration is not limiting. For example, other embodiments may reverse the location of the wheels, e.g., drive wheels in front and driven or undriven wheels in back. Moreover, other configurations may use different wheel configurations altogether, e.g., a tri-wheel configuration or a vehicle having conventionally-steered wheels. These and other embodiments are certainly possible without departing from the scope of the present disclosure. Moreover, while illustrated herein as wheels, other ground engaging members (e.g., tracks, skids, etc.) are also contemplated.

An implement 114, e.g., implement deck, may be connected to a lower side of the chassis 102 (generally longitudinally between the drive wheels 106 and the caster wheels 108). The implement 114 may extend between a first implement end 115 (e.g., a front end) and a second implement end 116 (e.g., a rear end) along the longitudinal axis 101.

Figure 4A:
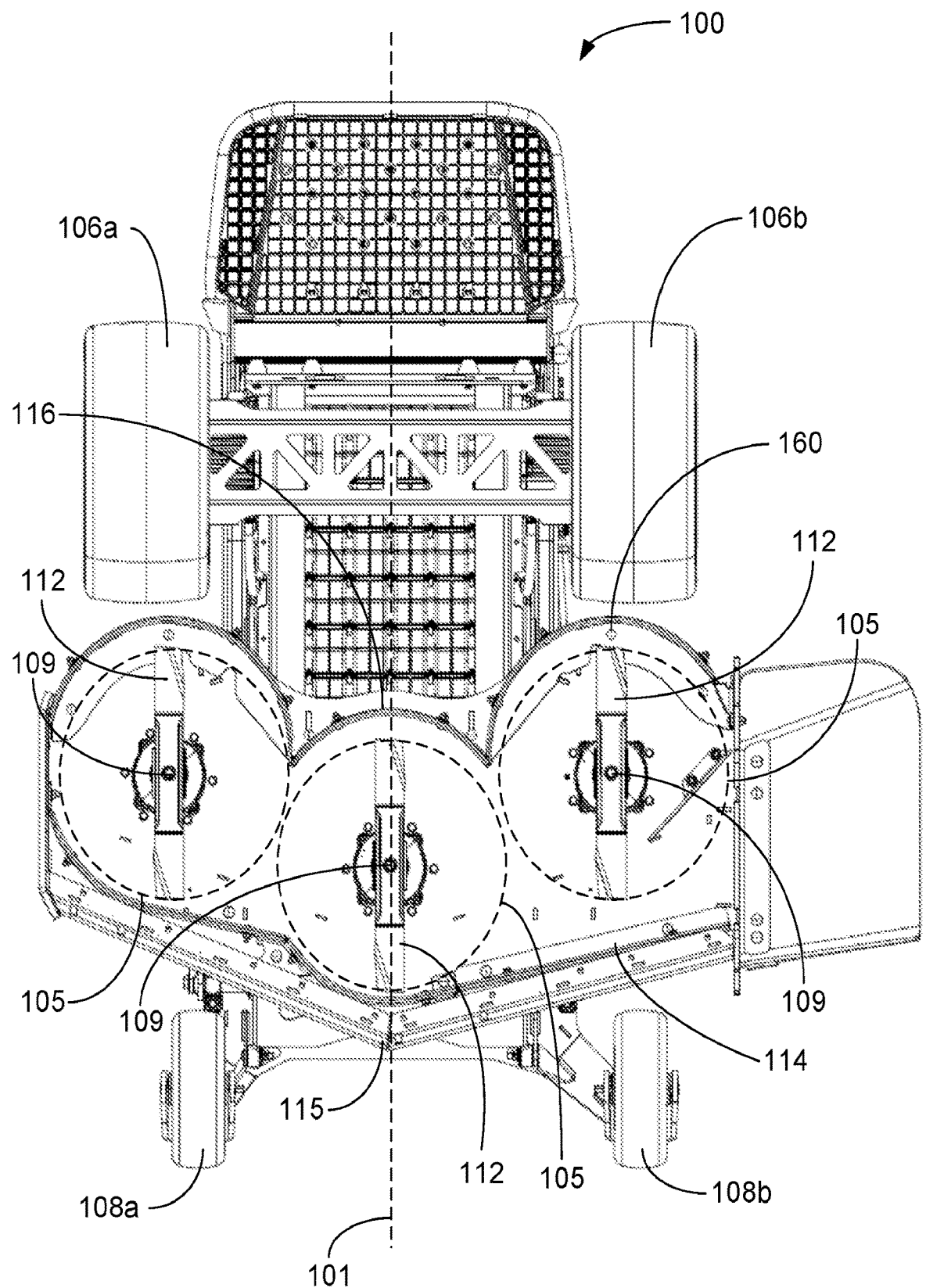
FIG. 4A is a bottom plan view of a ground working vehicle, e.g., a stand-on mower, with an adjustable implement in accordance with embodiments of the present disclosure.
Figure 4B:
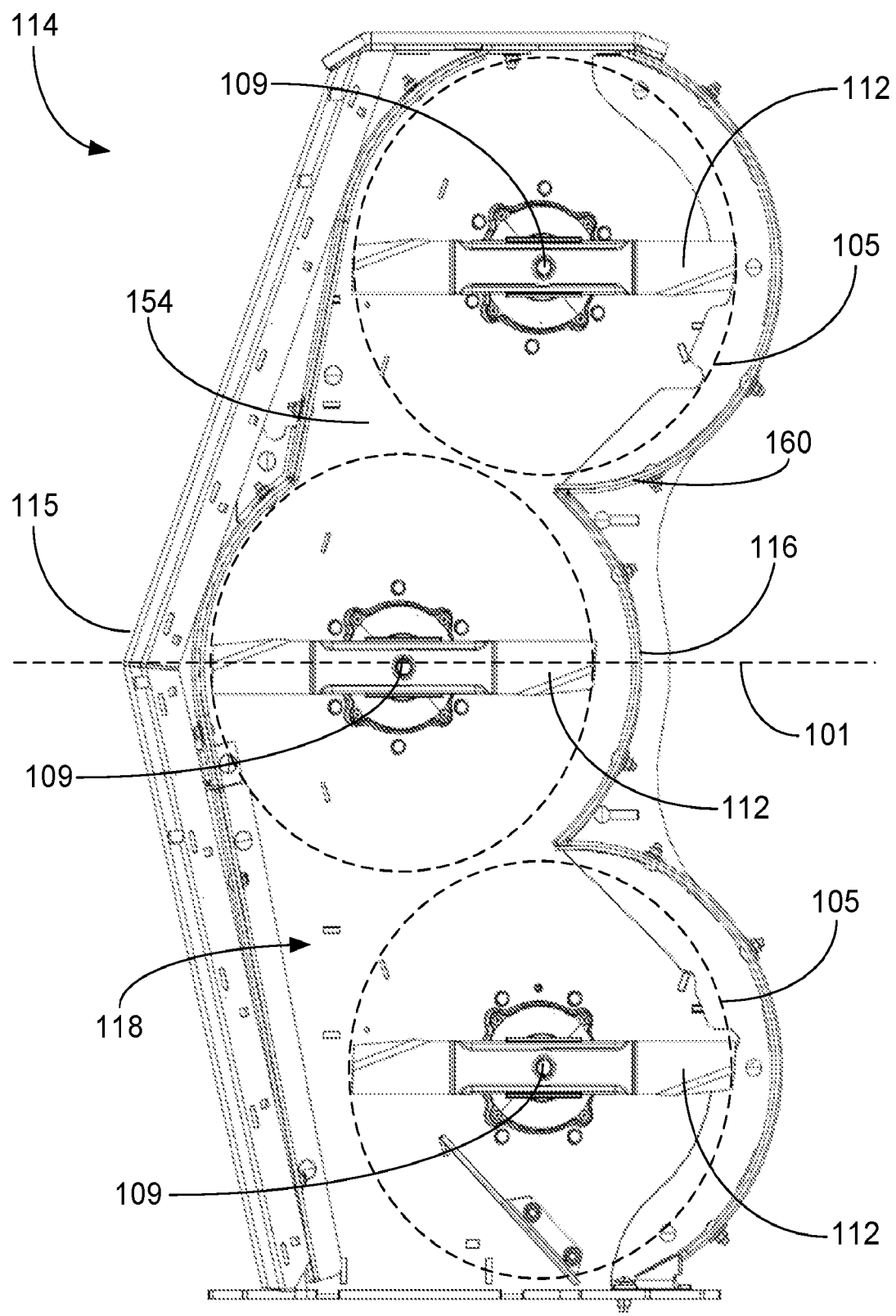
FIG. 4B is an isolated view of the bottom plan view of the adjustable implement of FIG. 4A.

The implement 114 (e.g., a cutting deck) may include one or more cutting blades 112 (e.g., as shown in FIGS. 4A and 4B) as known in the art. The cutting blades 112 may be operatively powered, via spindles connected to the implement 114, by the engine 104 via, e.g., an implement drive system. During operation, power may be selectively delivered to the implement 114, whereby the blades 112 rotate at a speed sufficient to sever grass and other vegetation as the implement 114 passes over the ground surface 103. As indicated above, other ground working vehicles 100 may locate the implement 114 above the chassis, or at other locations along the lower side of the chassis 102 (e.g., a forwardly-mounted or "out-front" deck configuration). Moreover, while illustrated as a cutting deck, the implement 114 may be any tool (e.g., aerator, spreader, sprayer etc.) that attaches to the chassis 102.

The mower 100 may further include an operator control system 110. In the illustrated embodiment, the control system 110 may include operator controls that are mounted to upwardly extending portions of the chassis referred to herein as control tower 111. The control tower 111 may be located at or near the rear end R of the mower 100. Situated near the top of the control tower 111 is a control area that positions mower controls within comfortable reach of an operator who may be standing either behind the mower or upon a platform. The control system 110 may include control levers configured to move the mower 100 forward and rearward. The control system 110 may also include a parking brake handle to selectively activate a brake when the vehicle is parked. A deck height selection tool 120 may also be provided to adjust the cutting height of the implement 114. Other controls may include a throttle lever to control the speed of the engine 104, and an implement clutch control to initiate and terminate power delivery to the cutting blades of the implement 114.

Further, the mower 100 may include an implement angle selection tool 130 configured to change an elevation of the second implement end 116 relative to the first implement end 115. The elevation of the second implement end 116 relative to the first implement end 115 may be described as the rake angle of the implement 114 (e.g., the angle of the implement 114 relative to the ground surface 103). The rake angle may also describe a planar declination of the cutting blade plane relative to the ground surface 103 from the rear to the front of the mower 100. As such, the rake angle may be defined by the vertical offset distance from the farthest forward blade tip to the farthest rearward blade tip as the blades travel through their respective paths. Additionally, the implement angle selection tool 130 may fix the elevation of the second implement end 116 relative to the first implement end 115. In other words, the implement angle selection tool 130 may change the angle of the implement 114 relative to the ground surface 103 and may also maintain the implement 114 at that angle. As such, the implement 114 may be oriented in a desired position (e.g., at a desired angle relative to the ground surface 103) by moving the second implement end 116 (e.g., the implement rear end) to different heights relative to the first implement end 115 (e.g., the implement front end).

The implement angle or rake angle may impact the operation of the implement and/or the performance of the implement. In examples where the vehicle is a mower, for example, the rake angle may modify performance in response to such conditions as moisture content, grass type, grass thickness and grass height, as examples. In some examples, performance characteristics include the quality of mulch production and the appearance of cut grass (e.g., quality of cut). In other examples, performance can be modified with adjustment of the implement angle for various modes of cutting grass such as discharging, mulching, and collecting.

Depending on the orientation of the implement 114, there may be more or less space (e.g., volume) between the implement 114 and the ground surface 103 for grass clippings to occupy. As the space between the implement 114 and the ground surface 103 increases, the amount of torque applied to the blade motor may decrease (e.g., because the volume of grass clippings per volume of space decreases). In other words, the grass clippings may have more room to move freely around in the cavity between the implement 114 and the ground surface 103. As the space between the implement 114 and the ground surface 103 decreases, the amount of torque applied to the blade motor may increase (e.g., because the volume of grass clippings per volume of space increases). In other words, the grass clippings may have less room to move freely around in the cavity between the implement 114 and the ground surface 103 and, therefore, may put extra stress or torque on the blade motor.

As the second implement end 116 of the implement 114 moves from a point closest to the ground surface 103 to a point farthest from the ground surface 103, the amount of space between the implement 114 and the ground surface 103 may increase (thereby decreasing the amount of torque on the blade motor). Also, the increased amount of space between the second implement end 116 and the ground surface 103 may allow for clippings to more easily exit the rear of the implement 114. As the second implement end 116 of the implement 114 moves from a point farthest from the ground surface 103 to a point closest to the ground surface 103, the amount of space between the implement 114 and the ground surface 103 may decrease (thereby increasing the amount of torque on the blade motor).

The amount of torque on the blade motor may alter the energy consumption of the vehicle. For example, as the amount of torque on the blade motor increases, the energy consumption of the vehicle increases (e.g., depleting the energy source quicker), and as the amount of torque on the blade motor decreases, the energy consumption of the vehicle decreases (e.g., depleting the energy source slower). Therefore, it may be described that the torque applied to the blade motor (by the grass clippings) may be directly related to the energy consumption of the vehicle. Also, by changing the amount of space between the implement 114 and the ground surface 103, the quality of cut (of the grass on the ground surface 103) may also be altered. For example, when the second implement end 116 is closer to the ground surface 103, the quality of cut may be better (e.g., due to increased mulching), and when the second implement end 116 is farther from the ground surface 103, the quality of cut may be worse. Thereby, when the torque applied to the blade motor increases, the quality of cut may improve (e.g., due to the decreased space between the implement 114 and the ground surface 103), and when the torque applied to the blade motor decreases, the quality of cut may worsen (e.g., due to the increased space between the implement 114 and the ground surface 103).

Having increased torque applied to the blade motor may also reduce the potential runtime of the mower 100, e.g., because increased torque may correlate to increased power demand or energy consumption (electrical or combustion). Therefore, because an increase in torque applied to the blade motor may reduce the potential runtime of the mower 100, an improvement in quality of cut (which is directly related to the torque) may result in a decrease in potential runtime, and vice versa. In other words, the quality of cut may be inversely related to the potential runtime of the mower 100.

As a result, a user may adjust the rake angle of the implement 114 such that the potential runtime of the mower 100 is greater than the desired runtime of the mower 100. In other words, the user may adjust the rake angle to ensure that the mower 100 is powered for the entirety of the task or job (if known). However, because the quality of cut may be inversely related to the potential runtime (e.g., due to the torque applied to the motor), the user may not want to adjust the rake angle to maximize the potential runtime because of the corresponding worsening in quality of cut. Instead, the user may want to adjust the rake angle of the implement 114 such that the potential runtime of the mower 100 almost (e.g., as close to exact as possible) equals the desired runtime of the mower 100 to optimize the quality of cut. In other words, the rake angle may be adjusted to maintain the highest possible quality of cut for the necessary amount of runtime. In other embodiments, the user may adjust the rake angle to achieve the desired quality of cut for a specific job, independent from the runtime (e.g., the runtime is secondary and the quality of cut is controlling). Further, the rake angle may be adjusted as desired to optimize the quality of cut.

Figure 2A:
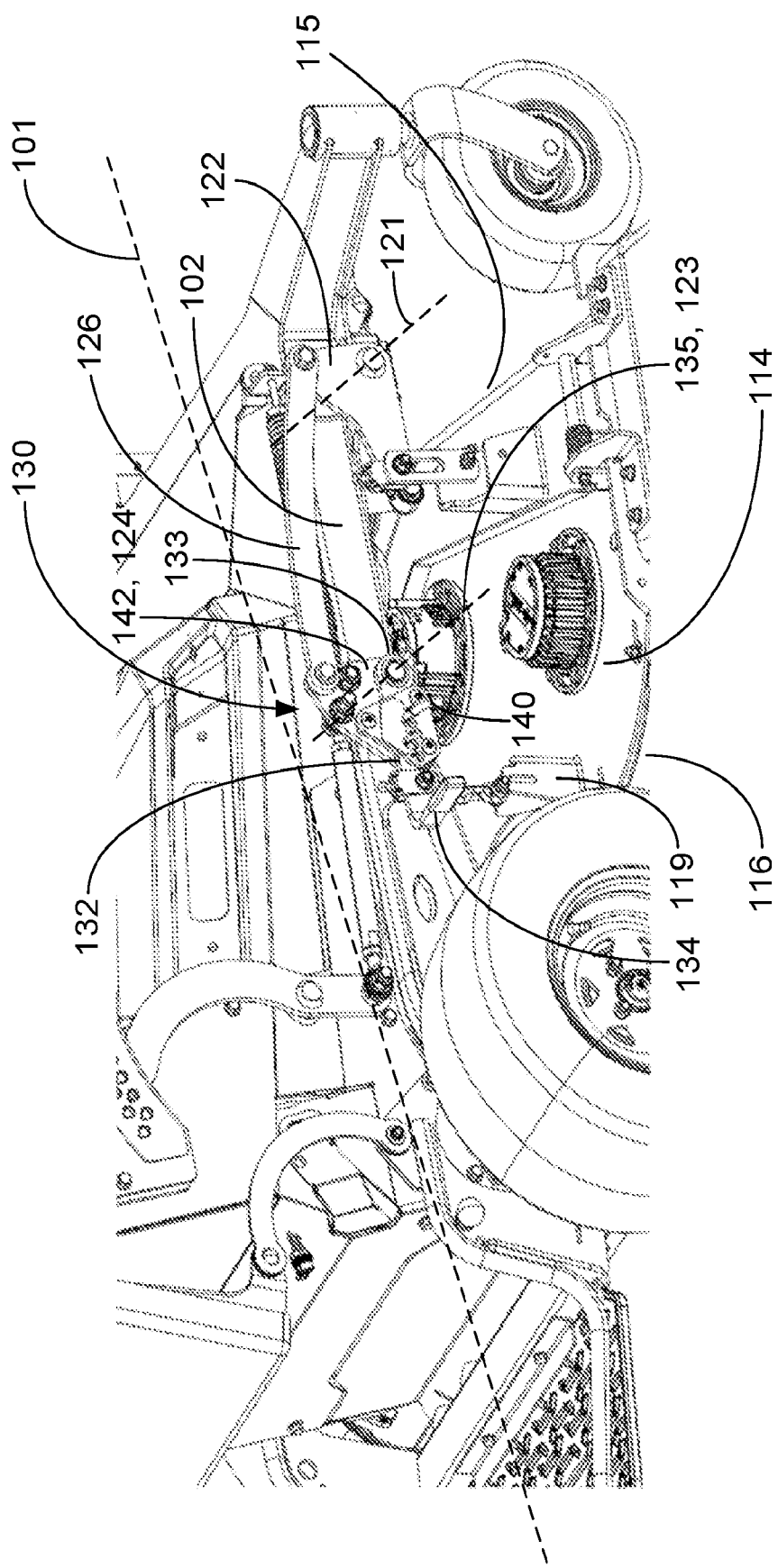
FIG. 2A is an enlarged view of the implement angle selection tool of FIG. 1.
Figure 2B:
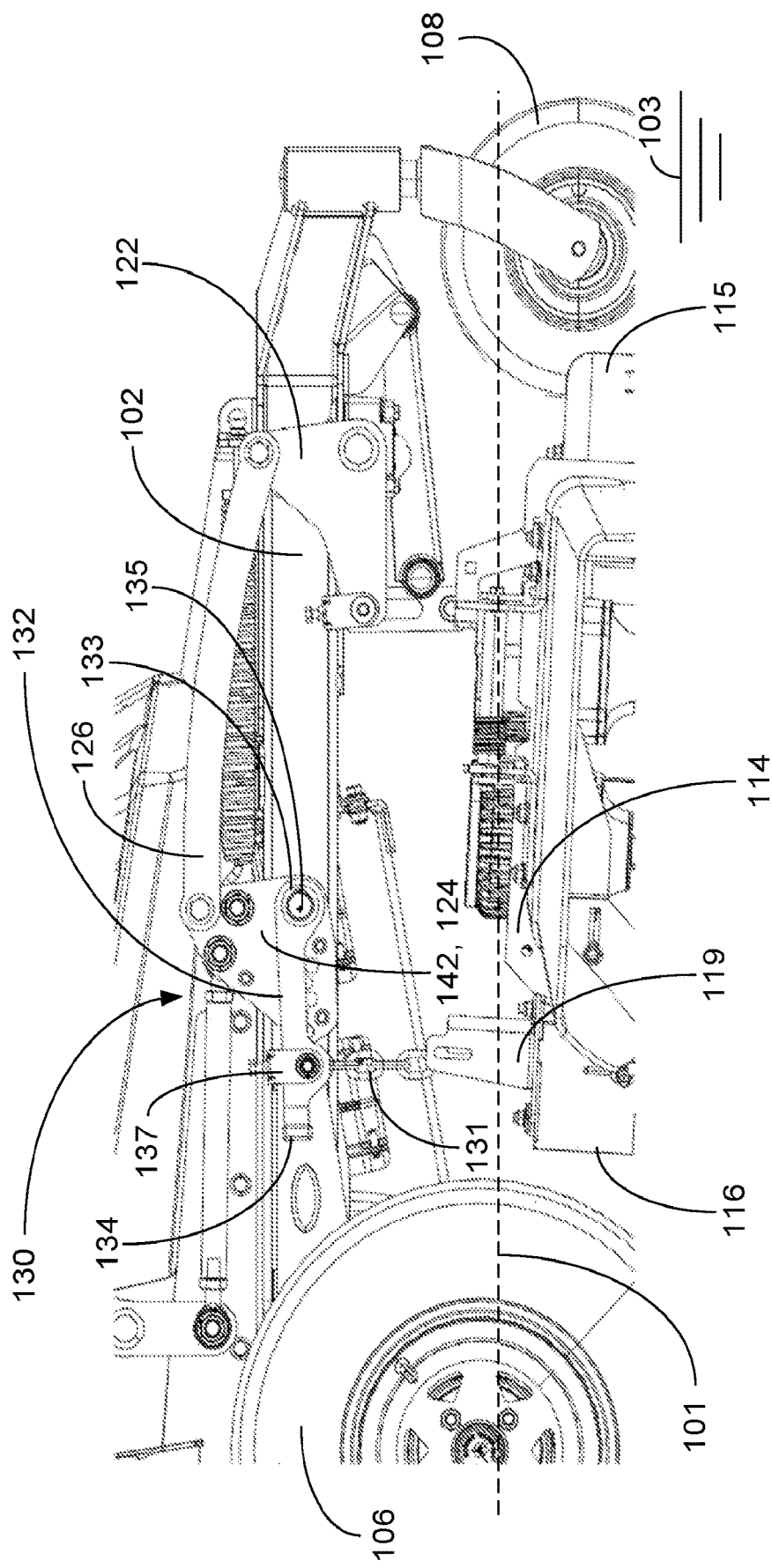
FIG. 2B is a right side plan view of the implement angle selection tool of FIG. 2A.
Figure 2C:
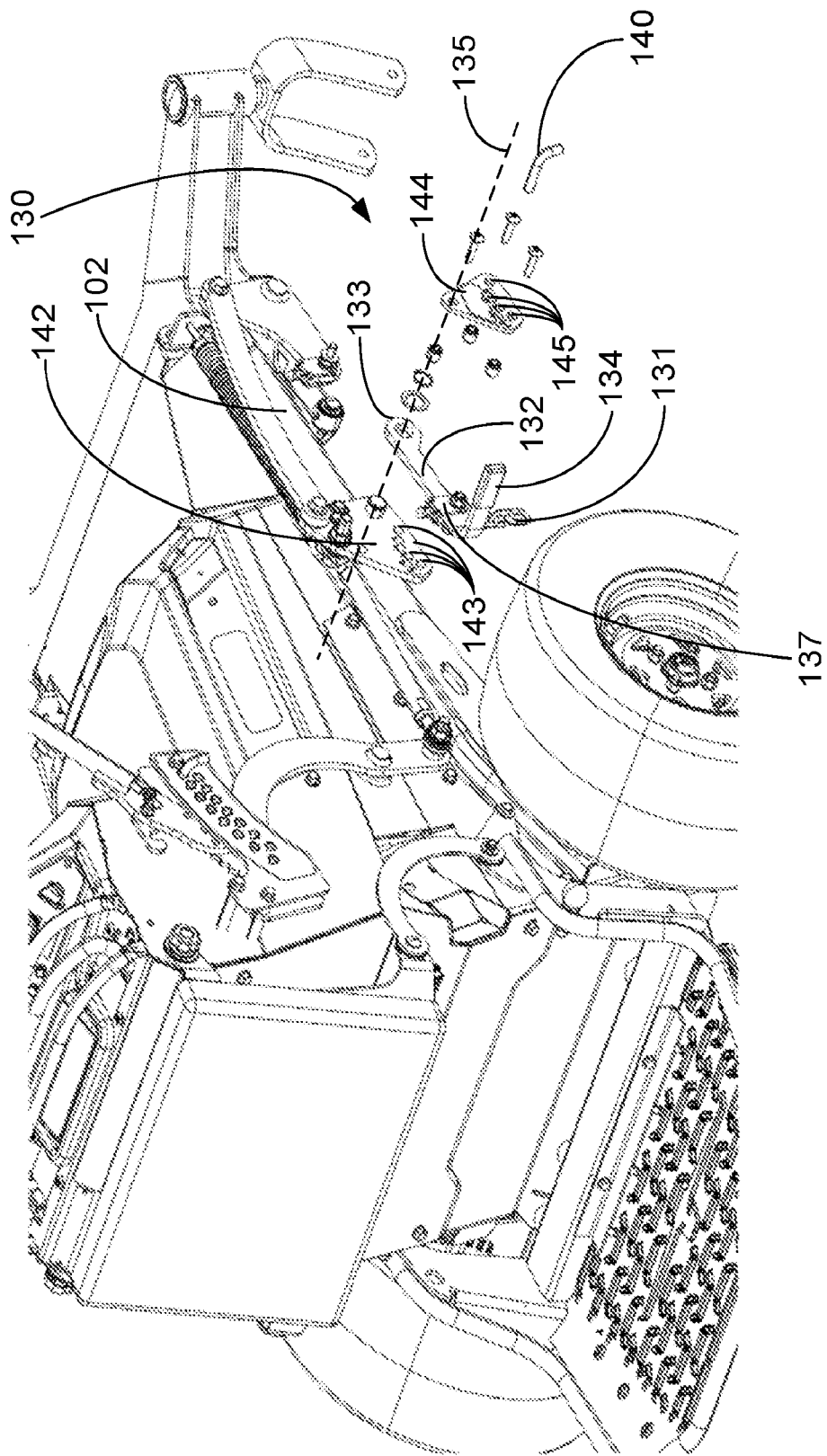
FIG. 2C is an exploded view of the implement angle selection tool of FIG. 2A.

The implement angle selection tool 130 may include a variety of different components or elements to assist in adjusting the rake angle of the implement 114. For example, as shown in FIGS. 2A-2C, the implement angle selection tool 130 may include an angle lever 132 pivotally attached to the vehicle frame 102 and connected to a portion of the implement 114 (e.g., proximate the second implement end 116). For example, the angle lever 132 may pivot about a lever pivot axis 135 that is perpendicular to the longitudinal axis 101. The angle lever 132 may be configured to be pivoted to adjust the elevation of the second implement end 116 relative to the first implement end 115. In such embodiments, the elevation of the second implement end 116 may be moved while the elevation of the first implement end 115 remains in place. In other embodiments, the first implement end 115 may be moved while the elevation of the second implement end 116 remains in place or the elevations of both of the first and second implement ends 115, 116 may be moved to change the relative elevation therebetween.

The angle lever 132 may extend between a first lever end 133 and a second lever end 134. The first lever end 133 may be pivotally attached to the vehicle frame 102 and the second lever end 134 may include a handle configured to be gripped by a user. In other words, the angle lever 132 may act as a linkage that is pivotally coupled to the vehicle frame 102 proximate the first lever end 133. The implement 114 may be connected to the angle lever 132 between the first and second lever ends 133, 134 (e.g., such that the implement 114 may move when the angle lever 132 is pivoted about the pivot axis 135). Further, the angle lever 132 may be connected to the portion of the implement 114 proximate the second implement end 116. Further yet, the angle lever 132 may be connected to the implement 114 in any suitable way (e.g., a tension only member) such as, e.g., a chain, a linkage, a bar, a cable, etc. It is noted that the angle lever 132 may be connected to the implement deck via either a flexible member or a rigid member. Specifically, a chain 131 may be coupled between a bracket 137 fastened to the angle lever 132 and an implement support 119 attached to the implement 114, e.g., as shown in FIGS. 2B and 2C.

In one or more embodiments, the angle lever 132 may extend rearward from the lever pivot axis 135 (e.g., as shown in FIGS. 2A-2C). Therefore, the angle lever 132 may be configured to pivot upwards (e.g., move along a clockwise direction when on the right side of the mower 100) to raise the second implement end 116 relative to the first implement end 115. The angle lever 132 may be configured to pivot downwards (e.g., move along a counter-clockwise direction when on the right side of the mower 100) to lower the second implement end 116 relative to the first implement end 115.

The implement angle selection tool 130 may also include a stopper 140 (e.g., as shown in FIGS. 2A and 2C) positionable proximate the angle lever 132 to restrict pivoting movement of the angle lever 132 (e.g., in at least one rotational direction). In one or more embodiments, the stopper 140 may be configured to position the angle lever 132 at an angle relative to the vehicle frame 102. For example, the stopper 140 may be removably coupled to the frame 102 in such a way that blocks the angle lever 132 from moving in at least one direction. The stopper 140 may extend along a direction that is parallel to the lever pivot axis 135 and the angle lever 132 may interact with stopper 140 perpendicular to that direction. In such embodiments, the stopper 140 may be removable from the frame 102 in the direction parallel to the lever pivot axis 135, but restricted from moving relative to the frame 102 in directions perpendicular thereto. Therefore, the stopper 140 may be freely inserted into and removed from the frame 102 while also restricting movement of the angle lever 132 (which pivots in a direction perpendicular to the direction or motion of the stopper 140).

In one or more embodiments, the stopper 140 may be positioned below the angle lever 132 such that the stopper 140 restricts downward movement of the angle lever 132 and allows upward movement of the angle lever 132. Specifically, the stopper 140 may be positioned below the angle lever 132 to restrict downward pivoting of the angle lever 132 that results from the weight of the implement 114 attached to the angle lever 132. Therefore, the rake angle of the implement 114 may be adjusted by lifting the angle lever 132, moving the stopper 140 to the desired location, and resting the angle lever 132 back on the stopper 140. In other embodiments, the stopper 140 may be configured to restrict both upward and downward movement of the angle lever 132 (e.g., the angle lever 132 may define an opening through which the stopper 140 may pass). The elevation of the second implement end 116 relative to the first implement end 115 (e.g., the rake angle of the implement 114) may vary depending on the angle of the angle lever 132, e.g., because the implement 114 is connected to the angle lever 132 and adjusting the angle of the angle lever 132 adjusts the elevation of the second implement end 116 (of the implement 114).

Further, in one or more embodiments, the stopper 140 may be configured to be positioned at a plurality of different locations to adjust the angle of the angle lever 132 (thereby adjusting the elevation of the second implement end 116) to restrict pivoting of the angle lever 132. Each different location of the plurality of locations may be associated with a different angle of the angle lever 132 when the angle lever 132 is resting on the stopper 140. Additionally, each different location of the plurality of locations may be associated with a corresponding different elevation of the second implement end 116 (e.g., relative to the first implement end 115).

As shown in FIGS. 2A-2C, the implement angle selection tool 130 may also include a plate 142 defining a plurality of holes 143 (e.g., shown in FIG. 2C). The plurality of holes 143 may correspond to the plurality of locations described above. For example, the stopper 140 may be inserted into one of the plurality of holes 143 to set the angle of the angle lever 132 (when the angle lever 132 is restricted by the stopper 140). Each of the plurality of holes 143 may define a different angle upon which the angle lever 132 may be restricted. Therefore, the stopper 140 may be easily inserted into and removed from a hole of the plurality of holes 143 to adjust to the desired angle of the angle lever 132, which sets the second implement end 116 to the desired elevation.

The stopper 140 may include any suitable component to restrict movement of the angle lever 132. For example, the stopper 140 may include a pin, a clip, etc. Specifically, the stopper 140 may include a pin that is configured to be inserted into a hole of the plurality of holes 143 to maintain the angle lever 132 at an elevation of the second implement end 116 relative to the first implement end 115 (e.g., to set the rake angle of the implement 114).

Furthermore, in one or more embodiments, the implement angle selection tool 130 may also include an additional plate 144 (e.g., as shown in FIG. 2C) defining a plurality of holes 145 that align with and correspond to the plurality of holes 143 of the plate 142. The stopper 140 (e.g., a pin) may be configured to be inserted through a hole 143 of the plate 142 and the corresponding hole of the plurality of holes 145 of the additional plate 144. The angle lever 132 may be configured to rest on the stopper 140 between the plate 142 and the additional plate 144. This configuration may provide additional stability for the angle lever 132 by providing support to the stopper 140 at two separate points.

Figure 3:
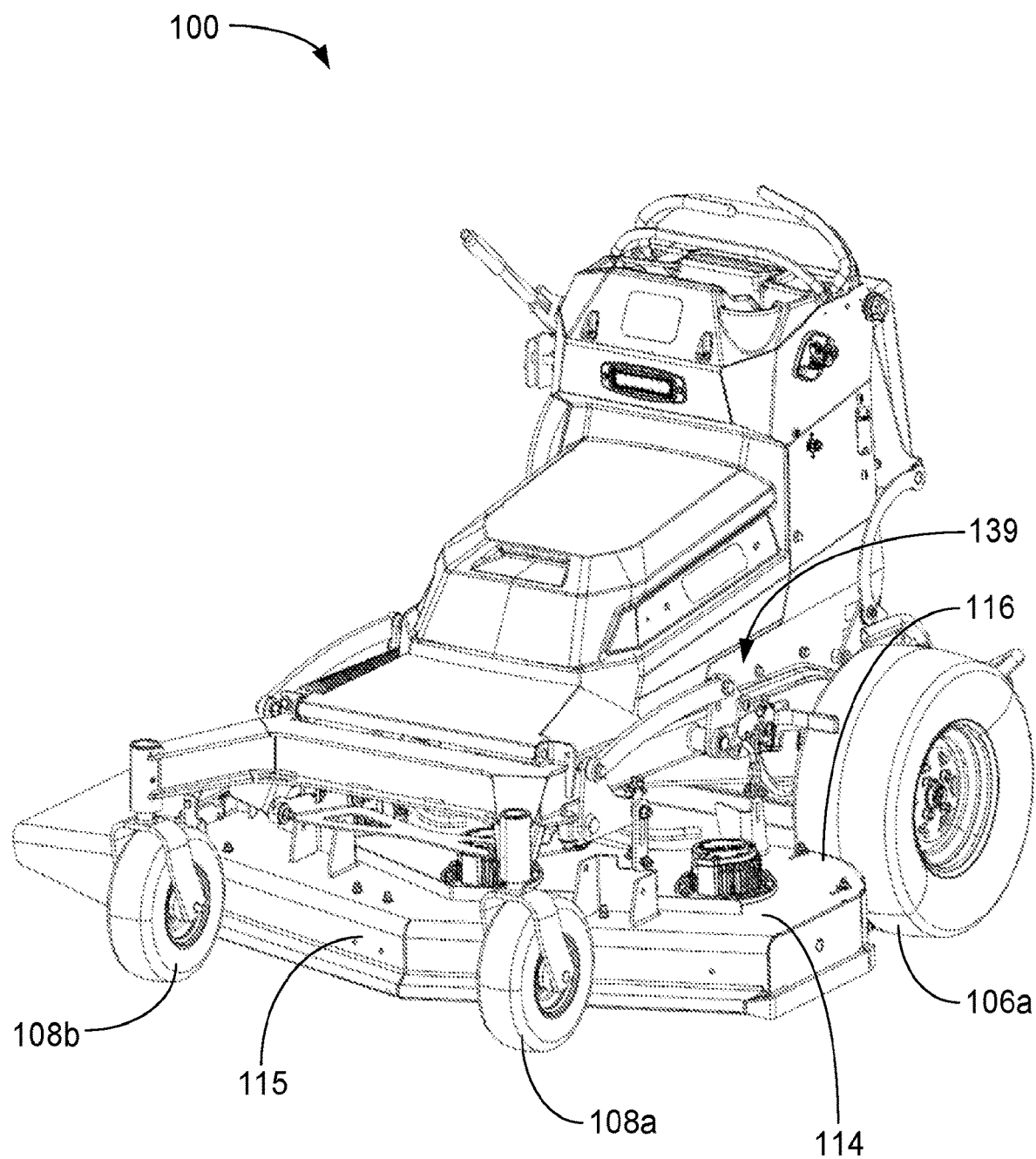
FIG. 3 is a left perspective view of the ground working vehicle of FIG. 1.

As shown in FIGS. 2A-2C, the implement angle selection tool 130 is provided on the right side of the mower 100. As shown in FIG. 3, a similar and complementary implement angle selection tool 139 may be provided on the left side of the mower 100. The implement angle selection tool 139 shown in FIG. 3 may include the same components and function in the exact same way as described by the implement angle selection tool 130 of FIGS. 2A-2C. For example, each of the implement angle selection tools 130, 139 may adjust the elevation of the corresponding side of the second implement end 116 (e.g., the implement angle selection tool 130 shown in FIGS. 2A-2C may adjust the right side of the second implement end 116 and the implement angle selection tool 139 shown in FIG. 3 may adjust the left side of the second implement end 116). By adjusting each of the implement angle selection tools 130, 139, the implement 114 may be independently adjusted and supported on each side.

However, in some embodiments, the implement angle selection tool 130 may only be included on one side of the mower. In such embodiments, the implement angle selection tool 130 may include linkages or bars that transmit the elevation change of the second implement end 116 to the opposite side of the mower 100 to assist in adjusting the rake angle. As such, the second implement end 116 of the implement 114 may be adjusted and supported on both sides using only a single implement angle selection tool. Although, in other embodiments, the implement angle selection tool may only be located on one side of the mower, but due to the rigidity of the implement 114, the second implement end 116 may maintain a constant elevation on both sides of the implement 114.

In one or more embodiments, the rake angle of the implement 114 (e.g., the elevation of the second implement end 116 relative to the first implement end 115) may be remotely controlled. In other words, the rake angle of the implement 114 may be adjusted without being manually and physically adjusted by a user. For example, in one or more embodiments, the mower 100 may include one or more actuators 150 operatively coupled to the implement deck (e.g., as shown schematically in FIG. 1). The one or more actuators 150 may be adapted to move or change the elevation of the second implement end 116 relative to the first implement end 115 (e.g., to adjust the rake angle of the implement 114). Further, the one or more actuators 150 may be adapted to fix the elevation of the second implement end 116 relative to the first implement end 115.

The mower may also include one or more controllers operatively coupled to the one or more actuators (e.g., as shown schematically in FIG. 1). For example, in one or more embodiments, the one or more controllers 152 may be adapted to allow a user to directly adjust the rake angle of the implement 114 via the one or more actuators 150. In other words, the user may be able to adjust the exact elevation of one or both of the first and second implement ends 115, 116 or the relative elevation between the first and second implement ends 115, 116. The one or more actuators 150 may include any suitable mechanism that moves the implement 114 such as, e.g., linear actuators, rotary actuators, hydraulic actuators, pneumatic actuators, electric actuators, etc.

In one or more embodiments, the one or more controllers 152 may be adapted to automatically adjust the rake angle of the implement 114 depending on other data or parameters. For example, the one or more controllers 152 may be adapted to automatically adjust the elevation of the second implement end 116 relative to the first implement end 115. Specifically, the one or more controllers 152 may be adapted to automatically increase the elevation of the second implement end 116 relative to the first implement end 115 when the torque of the plurality of cutting blades 112 increases. Also, specifically, the one or more controllers 152 may be adapted to automatically decrease the elevation of the second implement end 116 relative to the first implement end 115 when the torque of the plurality of cutting blades 112 decreases.

In one or more embodiments, the user may input data or parameters and the one or more controllers 152 may determine the optimal rake angle of the implement 114 under the conditions. For example, the user may input a desired operating parameter (e.g., runtime, quality of cut, etc.) and the one or more controllers 152 may determine the rake angle of the implement 114 to achieve the desired operating parameter. The one or more controllers 152 may also consider other data or use self-learning in determining the optimal rake angle, as will be discussed further herein.

Figure 9:
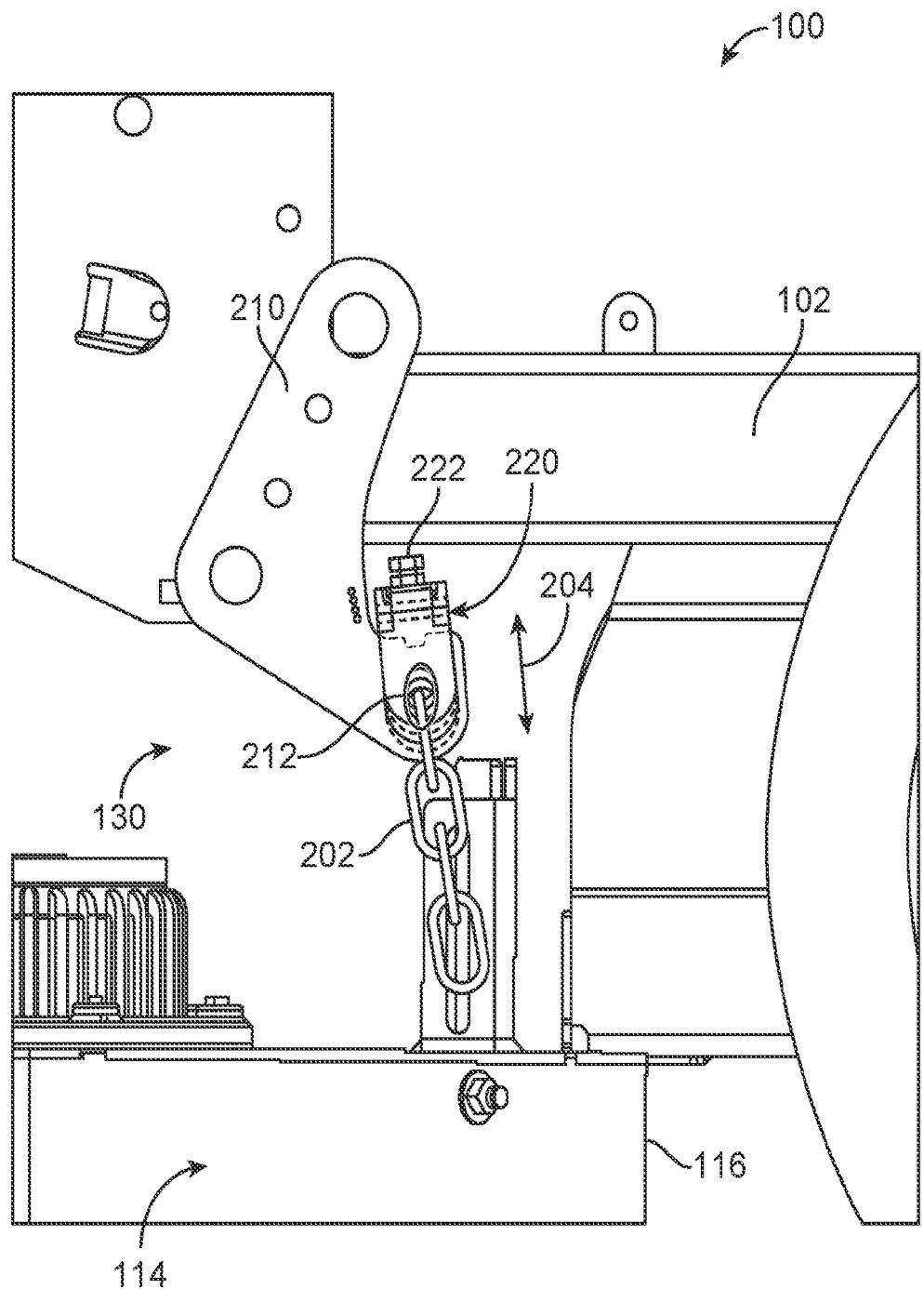
FIG. 9 is a side plan view of another implement angle selection tool of a ground working vehicle in accordance with embodiments of the present disclosure.

It is noted that implement angle selection tool 130 may include any suitable components or elements to assist in adjusting the rake angle of the implement 114. For example, as shown in FIG. 9, the implement angle selection tool 130 may include a bracket 210 fixedly coupled to the vehicle frame 102 proximate the second implement end 116 and defining a slot 212 therein. The implement angle selection tool 130 may further include an adjustment actuator 220 positioned to move along the slot 212 of the bracket 210 in the directions 204. The adjustment actuator 220 may include a screw 222 or fastener configured to be adjusted to move the adjustment actuator 220 along the slot 212. Further, the adjustment actuator may be coupled to a chain 202 that is also coupled to the implement 114. In other words, the chain 202 may be coupled between the adjustment actuator 220 and the implement 114. Therefore, as the adjustment actuator 220 moves along the slot 212, so too does the implement 114 via the chain 202. The screw 222 may be rotated to adjust the elevation of the implement 114 (e.g., at the second implement end 116) and, thereby, adjust the rake angle. In one or more embodiments, the implement selection tool 130 shown in FIG. 9 may be included on both the left and right sides of the vehicle proximate the second implement end 116. In other embodiments, the implement selection tool 130 shown in FIG. 9 may be centered between the left and right sides or only located on one side of the vehicle and the adjustment may be translated to the other side of the vehicle through a bar or linkage.

In yet other embodiments, the implement angle selection tool 130 may include a pin, a dial, a screw, etc. to adjust the rake angle of the implement 114. Similar to the implement angle selection tool described with respect to FIGS. 2A-2C, the implement angle selection tool illustrated in FIG. 9 (or any other component or element of an implement angle selection tool) may be operatively coupled to one or more actuators and one or more controllers to remotely and/or automatically adjust the rake angle of the implement 114.

Additionally, in one or more embodiments, the mower 100 may also include a height selection tool 120 (e.g., as shown in FIG. 1) configured to adjust a distance between the implement 114 and the ground surface 103. For example, the height selection tool 120 may be configured to select one vertical position of a plurality of selectable vertical positions (e.g., using a plurality of corresponding holes 125) and each vertical position may limit a distance between the implement 114 and the ground surface 103. The elevation of the second implement end 116 relative to the first implement end 115 (e.g., the rake angle of the implement 114) may be maintained at each of the vertical positions. In other words, the implement 114 will maintain the same rake angle relative to the ground surface 103 regardless of how the height of the implement 114 is adjusted.

As shown in FIG. 2A, the height selection tool 120 may include a first implement end plate 122 connected to the first implement end 115 and pivotally attached to the vehicle frame 102 (e.g., about a first implement end pivot axis 121). The height selection tool 120 may also include a second implement end plate 124 connected to the second implement end 116 and pivotally attached to the vehicle frame 102 (e.g., about a second implement end pivot axis 123). The first implement end plate 122 may be coupled to the second implement end plate 124 via a link 126 such that the first and second implement end plates 122, 124 pivot together to equally adjust the first and second implement ends 115, 116 of the implement 114. For example, the link 126 may define a fixed length such that the first and second implement end plates 122, 124 pivot simultaneously and equally. Further, as shown in FIG. 1, the height selection tool 120 may include one or more height linkages 128 pivotally coupled to the second implement end plate 124 and adapted to move the second implement end plate 124 about the second implement end pivot axis 123 to adjust the height of the implement 114. Further yet, the one or more height linkages 128 may interact with the plurality of selectable vertical positions (e.g., via a pin inserted into the plurality of holes 125 of the selectable vertical positions) to restrict movement of the one or more height linkages 128 and set the height of the implement 114. In other words, the one or more height linkages 128 may include a handle that a user to move to adjust and set the height of the implement 114.

In one or more embodiments, the second implement end plate 124 may be the plate 142 and the second implement end pivot axis 123 may be the angle lever pivot axis 135 (e.g., as shown in FIG. 2A). Therefore, the plurality of different locations for the stopper 140 (e.g., the plurality of holes 143 defined in the plate 142) may be defined by the second implement end plate 124. As such, the angle lever 132 may pivot relative to the second implement end plate 124. Further, the stopper 140 may restrict movement or fix the angle lever 132 relative to the second implement end plate 124 (e.g., to set the elevation of the second implement end 116 connected to the angle lever 132) when the stopper 140 is at one of the plurality of different locations (e.g., when the stopper 140 is received by one of the plurality of holes 143). Additionally, because the angle lever 132 may be restricted from moving relative to the second implement end plate 124 by the stopper 140 and the angle lever 132 is connected to the second implement end 116, when the second implement end plate 124 pivots, the angle lever 132 similarly pivots to adjust the height of the second implement end 116.

Figure 5B:
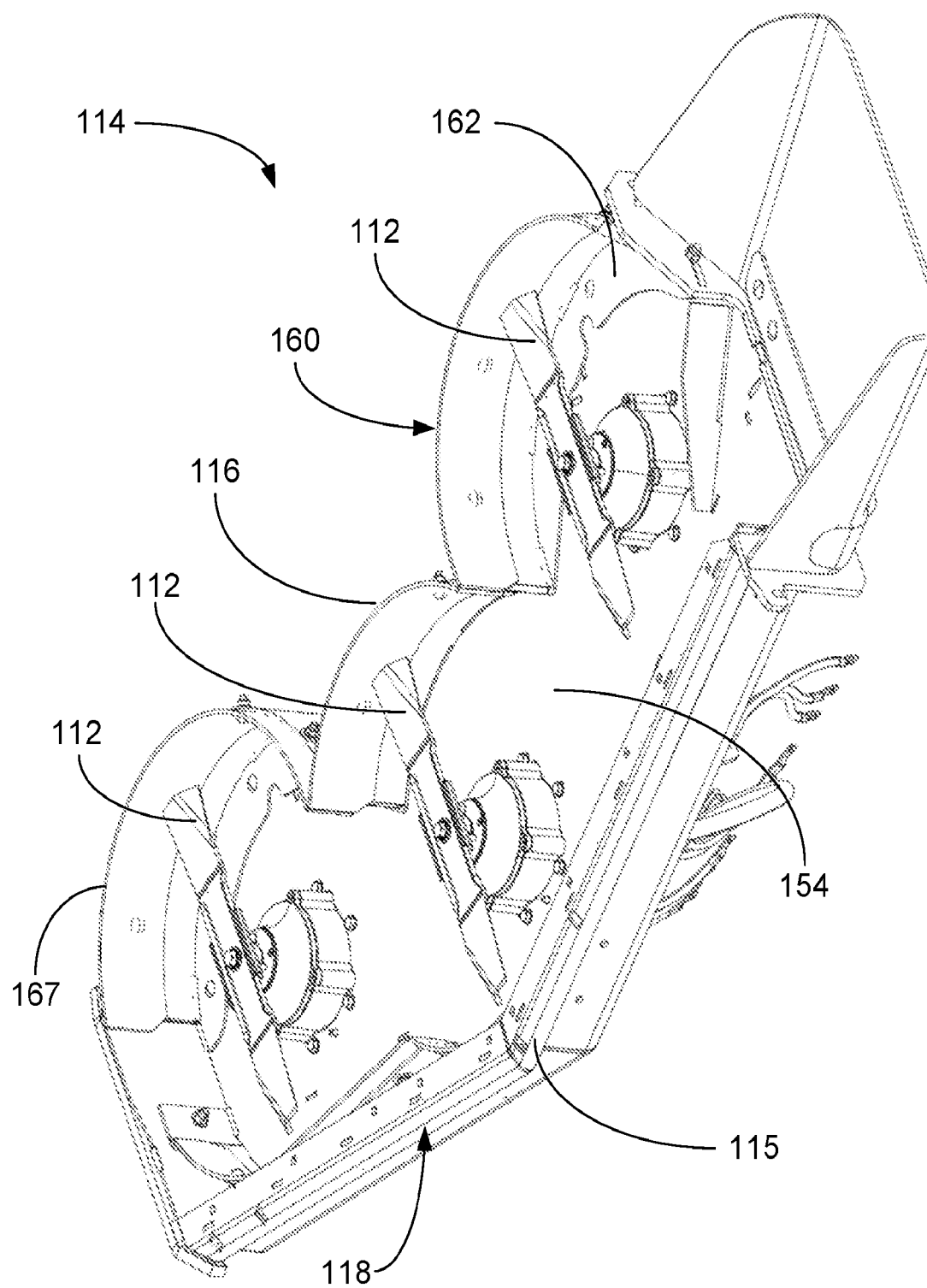
FIG. 5B is another perspective view of the adjustable implement of FIG. 4B.

In addition to adjusting the rake angle of the implement 114 to adjust the torque applied to the blade motor when in use, thereby adjusting the overall potential runtime or quality of cut, the dimensions of a cavity of the implement 114 may be modified to also adjust the torque applied to the blade motor when in use. For example, a rear baffle 160 of the implement 114 (e.g., as shown in FIGS. 5A and 5B) may be shortened or elongated in multiple directions to change the cavity of the implement 114. Based on the size and arrangement of the cavity of the implement 114, grass clippings may have more or less room to move around within the cavity, affecting the torque applied to the blade motors.

FIG. 4A illustrates a bottom view of a mower 100 showing an underside of an implement 114 and FIG. 4B illustrates the underside of the implement 114 isolated from the mower 100. The implement 114 may be coupled to the mower 100 and may extend between a first implement end 115 and a second implement end 116 along a longitudinal axis 101. The implement 114 may include a housing 118 defining a chamber or cavity. The implement 114 may include one or more cutting blades 112 disposed within the cavity and adapted to cut grass. Each of the cutting blades 112 may rotate about a cutting blade axis 109 and define a blade tip circle 105 (e.g., illustrated in dashed lines in FIGS. 4A and 4B) that projects the range of the cutting blade 112 as the cutting blade 112 rotates about the cutting blade axis 109. The implement 114 illustrated in FIGS. 4A and 4B include three cutting blades 112, but may include any suitable number of cutting blades 112.

Further, the housing 118 of the implement 114 may include an upper plate 154 and a baffle 160 extending from the upper plate 154 proximate the second implement end 116 (e.g., as shown in FIGS. 4A-4B and 5A-5B). The upper plate 154 may define the upper boundary of the implement 114 and, in one or more embodiments, may extend along a planar surface. Further, the blade motors may extend through the upper plate 154 such that at least a portion of the blade motor extends above the upper plate 154 of the implement 114 and the cutting blade 112 is positioned below the upper plate 154. The baffle 160 may extend along the edge of the implement 114 at the second implement end 116. As shown in FIGS. 4A and 4B, the baffle 160 defines a shape that is spaced apart and at least partially concentric to the blade tip circle 105 of each of the cutting blades 112. In other words, the baffle 160 follows the profile of a portion of the path of the cutting blade 112.

The baffle 160 may be adjusted in various ways to modify the size and dimensions of the cavity of the implement 114. Depending on the size and dimensions of the cavity, grass clipping contained therein may have more or less space to occupy and move. For example, when the grass clippings have more space to occupy and move, there may be a decreased amount of torque applied to the blade motor. Also, for example, when the grass clippings have less space to occupy and move, there may be an increased amount of torque applied to the blade motor. Therefore, because the torque applied to the blade motor may be inversely related to overall runtime of the mower 100 (e.g., increased torque may result in lower runtime and decreased torque may result in increased runtime), it may be useful to decrease torque applied to the blade motor in order to maximize the runtime of the mower 100.

However, similar to rake angle adjustments described herein, the position and arrangement of the baffle 160 may also affect the quality of cut of the grass mowed. For example, when there is an increased amount of torque applied to the blade motor (e.g., due to the grass clippings having less space to occupy and move), the quality of cut may improve (e.g., due to an increase in grass mulching). Also, for example, when there is a decreased amount of torque applied to the blade motor (e.g., due to the grass clippings having more space to occupy and exit), the quality of cut may worsen. As such, the quality of cut may be inversely related to the potential runtime of the mower 100 (which changes with the amount of torque applied to the blade motors). Therefore, the position and arrangement of the baffle 160 may be adjusted to optimize the quality of cut and overall runtime of the mower 100. Specifically, the position and arrangement of the baffle 160 may be adjusted such that the overall runtime of the mower 100 matches the desired runtime for a particular job or application. In other embodiments, the user may adjust the position and arrangement of the baffle 160 to achieve the desired quality of cut for a specific job, independent from the runtime (e.g., the runtime is secondary and the quality of cut is controlling).

Adjusting the positioning of the baffle 160 of the implement 114 may especially affect performance in the absence of a side discharge to the implement 114. For example, when a side discharge is present on the implement 114, the grass clippings may exit the side discharge. However, if no side discharge is present (e.g., to minimize width profile of implement 114) such as when a plug is inserted into the side discharge for mulching, the grass clippings stay within the cavity of the implement 114 for a longer period of time. Further, the grass clippings may discharge from the cavity of the implement 114 through the back of the implement 114. Therefore, if the total volume of the cavity of the implement 114 or the gap between the implement 114 and the ground surface 103 is modified, the movement and exit of the grass clippings may also be modified (e.g., by either more easily exiting the cavity of the implement 114 or being contained within the cavity of the implement 114).

Figure 6:
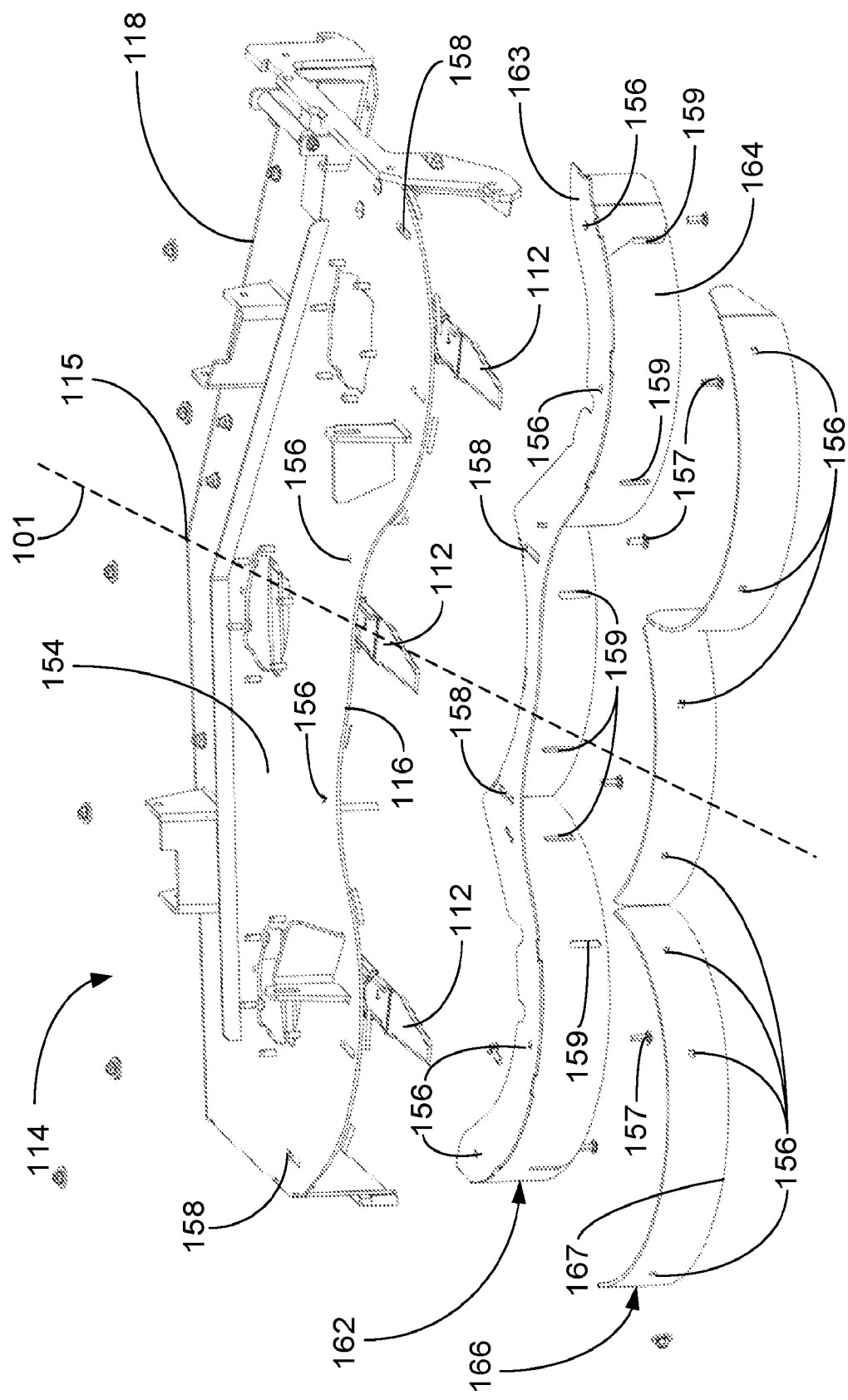
FIG. 6 is an exploded view of the adjustable implement of FIG. 4B.

The baffle 160 may include various different components to adjust the position and arrangement of the implement 114. For example, in one or more embodiments, the baffle 160 may include a first plate 162 (e.g., as shown in FIGS. 5B and 6) movably coupled to the upper plate 154 (e.g., proximate the second implement end 116) such that the first plate 162 moves along a direction parallel to the longitudinal axis 101. The first plate 162 may include a horizontal plate portion 163 and a vertical plate portion 164 as shown in FIG. 6. The horizontal plate portion 163 of the first plate 162 may be movably coupled to the upper plate 154.

The first plate 162 may be configured to move in a direction parallel to the longitudinal axis 101, relative to the upper plate 154. For example, the first plate 162 (e.g., the vertical plate portion 164) may move towards and away from the closest point of the blade tip circle 105. In other words, the first plate 162 may be configured to move relative to the upper plate 154 such that a minimum distance between a portion of the first plate 162 (e.g., the vertical plate portion 164) and a blade tip circle 105 of the plurality of cutting blades 112 ranges from 0 to 2.5 inches (e.g., greater than or equal to 0 inches, greater than or equal to 0.5 inches, greater than or equal to 1 inch, etc. and/or less than or equal to 2.5 inches, less than or equal to 2 inches, less than or equal to 1.5 inches, etc.). As the first plate 162 moves towards the blade tip circle 105, the volume of the cavity of the implement 114 decreases and as the first plate 162 moves away from the blade tip circle 105, the volume of the cavity of the implement 114 increases. Decreasing the volume of the cavity of the implement 114 may result in increased torque applied to the blade motors and decreased overall runtime of the mower 100 (and, e.g., improving quality of cut), and increasing the volume of the cavity of the implement 114 may result in decreased torque applied to the blade motors and increased overall runtime of the mower 100 (and, e.g., worsening quality of cut).

The first plate 162 may move relative to the upper plate 154 in a variety of different ways. For example, one or both of the upper plate 154 and the first plate 162 may define one or more horizontal slots 158 aligned along the longitudinal axis 101. The other of the upper plate 154 and the first plate 162 may define one or more openings 156 (e.g., circular, square, etc.) that correspond with the one or more horizontal slots 158. Further, a fastener 157 may extend through the corresponding opening 156 and horizontal slot 158 such that the first plate 162 may move relative to the upper plate 154 via the one or more horizontal slots 158. For example, the fastener 157 may extend through the horizontal slot 158 such that the first plate 162 may move along the horizontal slot 158 and the fastener 157 may be tightened to fix the first plate 162 at a position along the horizontal slot 158. As shown in FIG. 6, the first plate 162 (e.g., the horizontal plate portion 163) may include one or more horizontal slots 158 and one or openings 156 that correspond to one or more openings 156 and one or more horizontal slots 158, respectively, of the upper plate 154. It is noted that the first plate 162 may move relative to the upper plate 154 in any other suitable way such as, e.g., rails, etc.

Additionally, in one or more embodiments, the baffle 160 may include a second plate 166 (e.g., as shown in FIGS. 5A-5B and 6) movably coupled to the first plate 162 (or, e.g., a portion of the upper plate 154) such that the second plate 166 moves along a direction perpendicular to the longitudinal axis 101 (e.g., in a vertical direction). The second plate 166 may extend in a generally vertical direction (e.g., at a right angle to the upper plate 154) and define a contour similar to the blade tip circles 105 of the cutting blades 112.

The second plate 166 may be movably coupled to the upper plate 154 to extend and retract the vertical height of a back of the implement 114. For example, the second plate 166 may move downward relative to the upper plate 154 (or the first plate 162) to increase the vertical height of the rear of the implement 114 or may move upward relative to the upper plate 154 (or the first plate 162) to decrease the vertical height of the rear of the implement 114. In other words, the second plate 166 may be configured to move relative to the first plate 162 such that a minimum distance between the second plate 166 (e.g., a bottom edge 167 thereof) and a ground surface 103 ranges from 0.5 inches to 6 inches (e.g., greater than or equal to 0.5 inches, greater than or equal to 0.875 inches, greater than or equal to 1.5 inches, greater than or equal to 2.5 inches, etc. and/or less than or equal to 6 inches, less than or equal to 5.125 inches, less than or equal to 4 inches, less than or equal to 3 inches, etc.)

Further, the second plate 166 may be configured to move relative to the first plate 162 such that a minimum distance between the second plate 166 (e.g., a bottom edge 167 thereof) and the cutting blade 112 of the implement 114 ranges from 0.6 inches below the cutting blade 112 and 0.9 inches above the cutting blade 112. In other words, the second plate 166 may move from covering the cutting blade 112 by about 0.6 inches to having the cutting blade 112 exposed by about 0.9 inches (e.g., measured along a vertical direction).

The distance of a gap between the bottom edge 167 of the second plate 166 and the ground surface 103 may affect the operation of the implement 114. For example, as the gap between the bottom edge 167 of the second plate 166 and the ground surface 103 increases, the number of grass clippings that can more easily exit the rear of the implement 114 may increase (thereby decreasing the amount of torque applied to the blade motors). Also, for example, as the gap between the bottom edge 167 of the second plate 166 and the ground surface 103 decreases, the number of grass clippings that can more easily exit the rear of the implement 114 may decrease (thereby increasing the amount of torque applied to the blade motors).

The second plate 166 may move relative to the first plate 162 in a variety of different ways. For example, one or both of the first plate 162 and the second plate 166 may define one or more vertical slots 159 aligned perpendicular to the longitudinal axis 101 (e.g., along a vertical direction). The other of the first plate 162 and the second plate 166 may define one or more openings 156 that correspond with the one or more vertical slots 159. Further, a fastener 157 may extend through the corresponding opening 156 and vertical slot 159 such that the second plate 166 may move relative to the first plate 162 via the one or more vertical slots 159. For example, the fastener 157 may extend through the vertical slot 159 such that the second plate 166 may move along the vertical slot 159 and the fastener 157 may be tightened to fix the second plate 166 at a position along the vertical slot 159. As shown in FIG. 6, the second plate 166 may include multiple openings 156 that correspond to multiple vertical slots 159 of the first plate 162. It is noted that the second plate 166 may move relative to the first plate 162 in any other suitable way such as, e.g., rails, etc.

The baffle 160 may adjust the arrangement and dimensions of the implement 114 using the first plate 162 and/or the second plate 166. For example, in one embodiment, the baffle 160 may only include the first plate 162 that is configured to move relative to the upper plate 154 in a direction along the longitudinal axis 101. In another embodiment, the baffle 160 may only include a second plate 166 that is configured to move relative to the upper plate 154 in a direction perpendicular to the longitudinal axis 101 (e.g., a vertical direction). In yet another embodiment, the baffle 160 may include both of the first and second plates 162, 166 that are configured to move relative to the upper plate 154 in directions along the longitudinal direction 101 and perpendicular to the longitudinal direction 101, respectively.

Furthermore, in one or more embodiments, the baffle adjustment may be remotely controlled. In other words, the rear baffle 160 of the implement 114 may be adjusted without being manually or physically adjusted by a user. For example, in one or more embodiments, the mower 100 may include one or more actuators 150 operatively coupled to the baffle 160 of the implement 114 (e.g., as shown schematically in FIGS. 5A and 5B). The one or more actuators 150 may be adapted to move the baffle 160 relative to the upper plate 154. For example, the one or more actuators 150 may be adapted to move the first plate 162 relative to the upper plate 154 and/or the second plate 166 relative to the first plate 162 (e.g., to adjust the characteristics and dimensions of the implement 114). Further, the one or more actuators 150 may be adapted to fix the position of the first plate 162 relative to the upper plate 154 and/or the position of the second plate 166 relative to the first plate 162. The one or more actuators 150 may include any suitable mechanism that moves the implement 114 such as, e.g., linear actuators, rotary actuators, hydraulic actuators, pneumatic actuators, electric actuators, etc.

The mower may also include one or more controllers 152 operatively coupled to the one or more actuators 150 (e.g., as shown schematically in FIG. 5A). For example, in one or more embodiments, the one or more controllers 152 may be adapted to allow a user to directly adjust the position of the first plate 162 and/or the second plate 166 via the one or more actuators 150. In other words, the user may be able to adjust the exact position of one or both of the first and second plates 162, 166 of the baffle 160.

In one or more embodiments, the one or more controllers 152 may be adapted to automatically adjust the position of the baffle 160 of the implement 114 depending on other data or parameters. For example, the one or more controllers 152 may be adapted to automatically adjust a minimum distance between the baffle 160 and a blade tip circle 105 of the plurality of cutting blades 112 and/or automatically adjust a minimum distance between the baffle 160 (e.g., a bottom edge 167 of the second plate 166) and a ground surface 103.

Specifically, the one or more controllers 152 may be adapted to increase the minimum distance between the baffle 160 and the blade tip circle 105 of the plurality of cutting blades 112 when the torque of the plurality of cutting blades 112 increases. Also, specifically, the one or more controllers 152 may be adapted to decrease the minimum distance between the baffle 160 and the blade tip circle 105 of the plurality of cutting blades 112 when the torque of the plurality of cutting blades 112 decreases. Further, the one or more controllers 152 may be adapted to increase the minimum distance between the baffle 160 and the ground surface 103 when the torque of the plurality of cutting blades 112 increases. Further yet, the one or more controllers 152 may be adapted to decrease the minimum distance between the baffle 160 and the ground surface 103 when the torque of the plurality of cutting blades 112 decreases.

In one or more embodiments, the user may input data or parameters and the one or more controllers 152 may determine the optimal baffle position under the conditions. For example, the user may input a desired operating parameter (e.g., runtime, quality of cut, etc.) and the one or more controllers 152 may determine the baffle position to achieve the desired operating parameter. The one or more controllers 152 may also consider other data or use self-learning in determining the optimal baffle position, as will be discussed further herein.

Figure 7A:
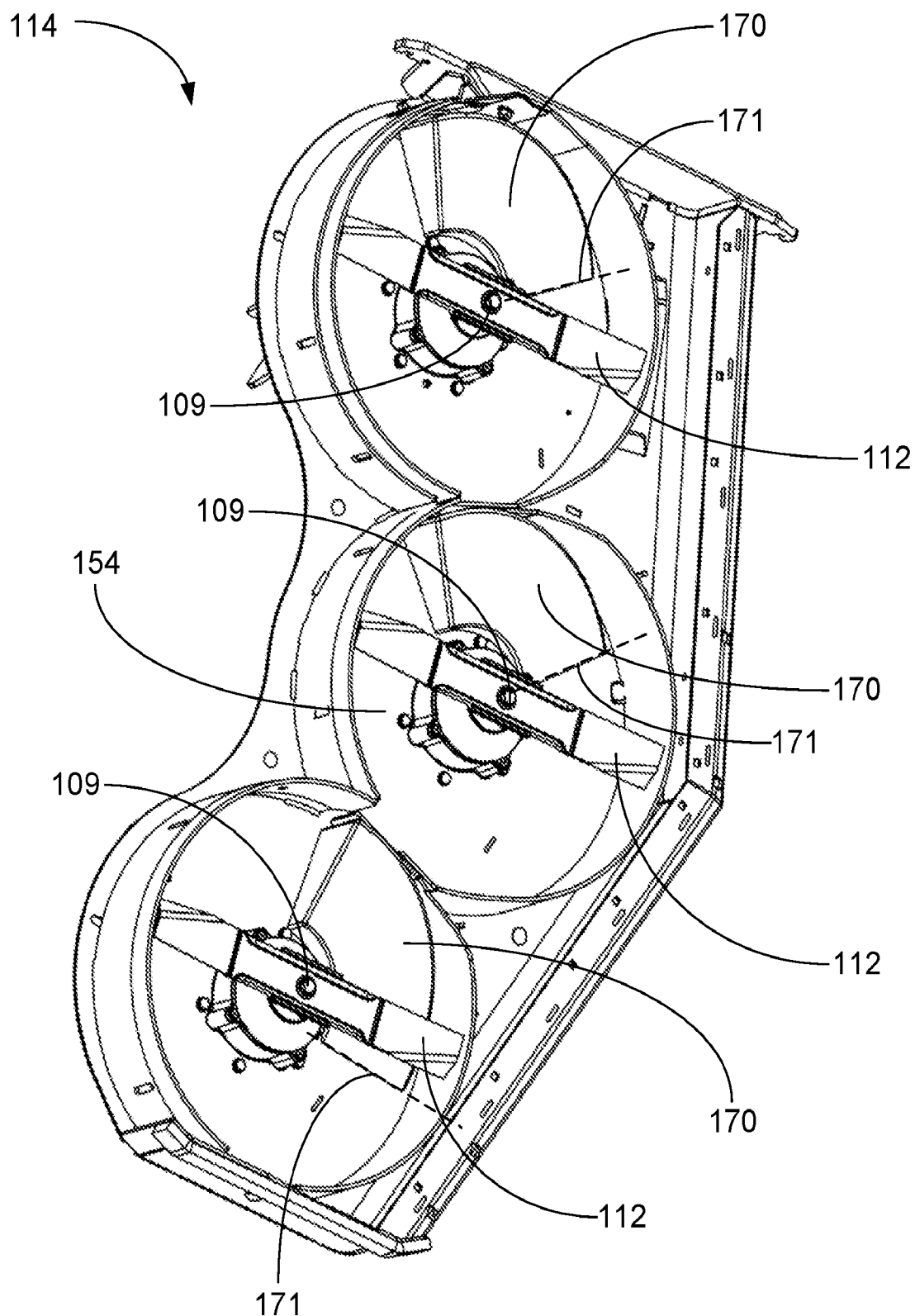
FIG. 7A is an isolated bottom perspective view of an implement of a ground working vehicle having an adjustable ramp configured in a first position in accordance with embodiments of the present disclosure.

In addition to adjusting the rake angle of the implement 114 and the dimensions of the cavity of the implement 114, the mower 100 may also include one or more kick-down baffles 170 to modify the characteristics of the cavity of the implement 114. For example, a perspective view of an underside of the implement 114 including kick-down baffles 170 is shown in FIG. 7A. Each kick-down baffle of the one or more kick-down baffles 170 corresponds to a cutting blade of the plurality of cutting blades 112. Further, the kick-down baffles 170 may be adapted to pivot to a position between the corresponding cutting blade 112 and the upper plate 154 of the implement 114. As such, the kick-down baffle 170 may be adapted to deflect grass clippings towards the ground surface 103. Additionally, the kick-down baffle 170 may be adjusted (e.g., pivoted or rotated) to optimize the quality of cut and overall runtime of the mower 100 for a given application.

The kick-down baffles 170 may pivot about kick-down pivot axis 171 that is within a plane of the upper plate 154.

Figure 8A:
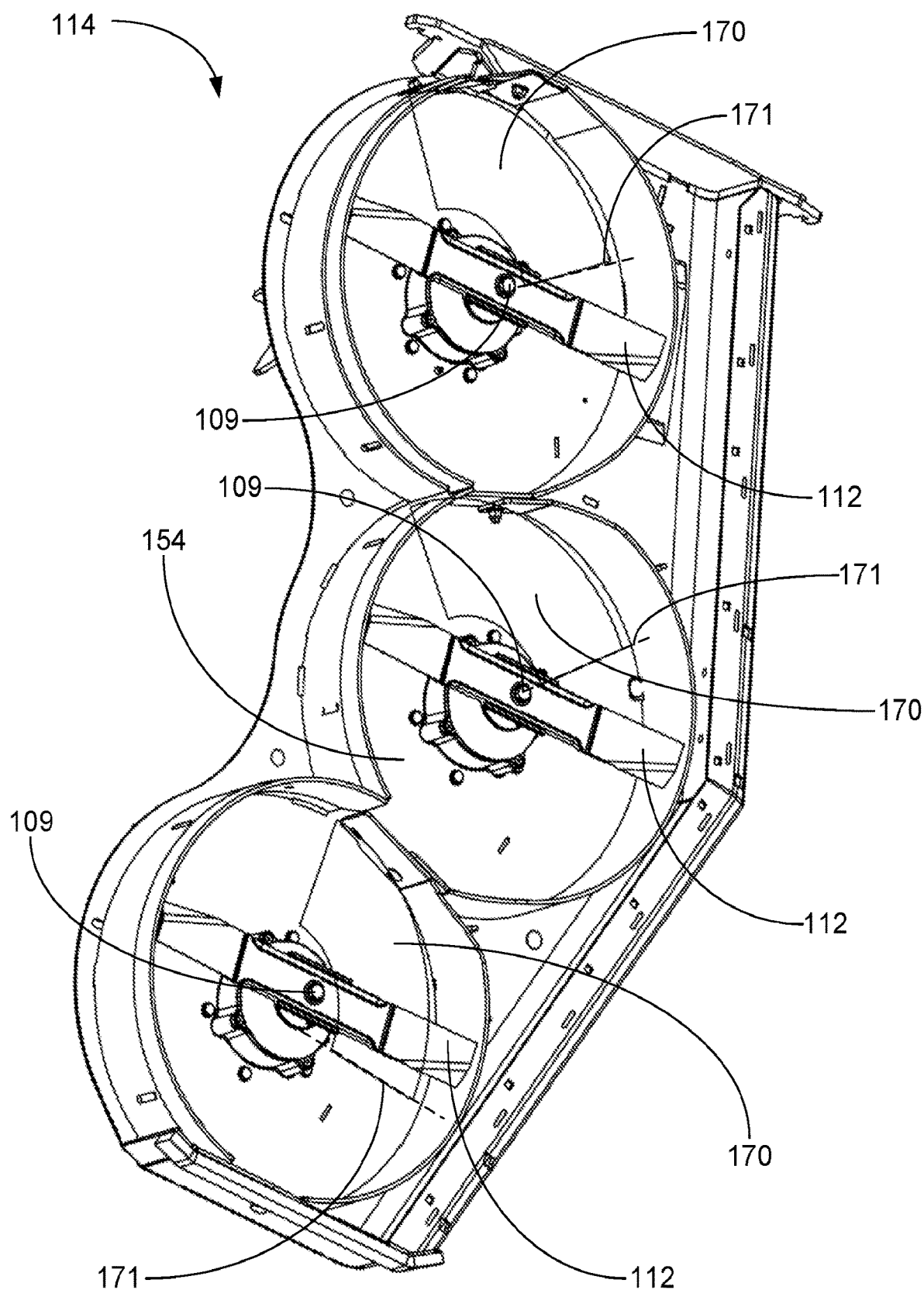
FIG. 8A is an isolated bottom perspective view of an implement of a ground working vehicle having an adjustable ramp configured in a second position in accordance with embodiments of the present disclosure.

Therefore, the kick-down baffles 170 may extend between an angle relative to the upper plate 154 of about 0 degrees and 30 degrees (e.g., greater than or equal to 0 degrees, greater than or equal to 5 degrees, greater than or equal to 10 degrees, greater than or equal to 15 degrees, etc. and/or less than or equal to 30 degrees, less than or equal to 25 degrees, less than or equal to 23 degrees, less than or equal to 20 degrees, etc.). In other words, the kick-down baffles 170 may extend between being flush with the upper plate 154 (e.g., as shown in FIG. 8A), within the cavity of the implement 114, and some angle extending into the cavity towards the cutting blades 112 (e.g., as shown in FIG. 7A). The kick-down baffle 170 does not interfere with the path of the cutting blade 112 (e.g., there may be a gap between the kick-down baffle 170 and the cutting blade 112 when the kick-down baffle 170 is fully pivoted into the cavity of the implement 114). Further, in one or more embodiments, the kick-down baffle 170 may pivot about a kick-down pivot axis 171 that extends along a radial line from a cutting blade axis 109 of the corresponding cutting blade 112.

The kick-down baffle 170 may define any suitable shape. For example, in one or more embodiments, the kick-down baffle 170 may define a wedge shape. In such embodiments, an edge of the wedge shaped kick-down baffle 170 may extend along an axis 171 within the plane of the upper plate 154 to pivot the kick-down baffle 170 into the cavity of the implement 114. In other embodiments, the kick-down baffle 170 may define a plate that pivots into the cavity of the implement 114. In yet other embodiments, the kick-down baffle 170 may define a shape of a portion of a ring. For example, the kick-down baffle 170 may be defined or bounded by two radial lines extending from the cutting blade axis 109 and two concentric circles spaced away from the cutting blade axis 109 (e.g., as shown in FIG. 7A).

Figure 7B:
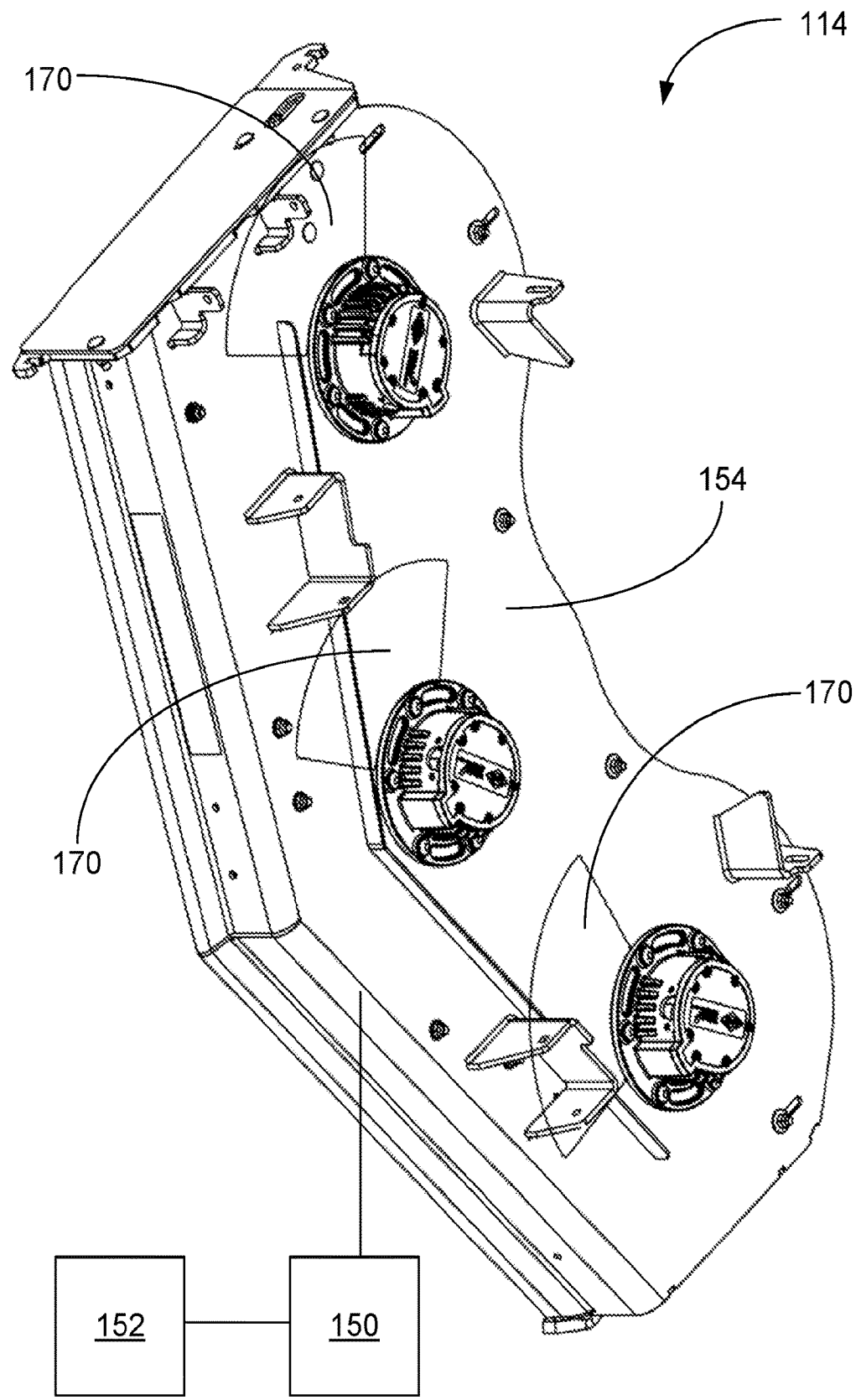
FIG. 7B is an isolated top perspective view of the implement of FIG. 7A.
Figure 8B:
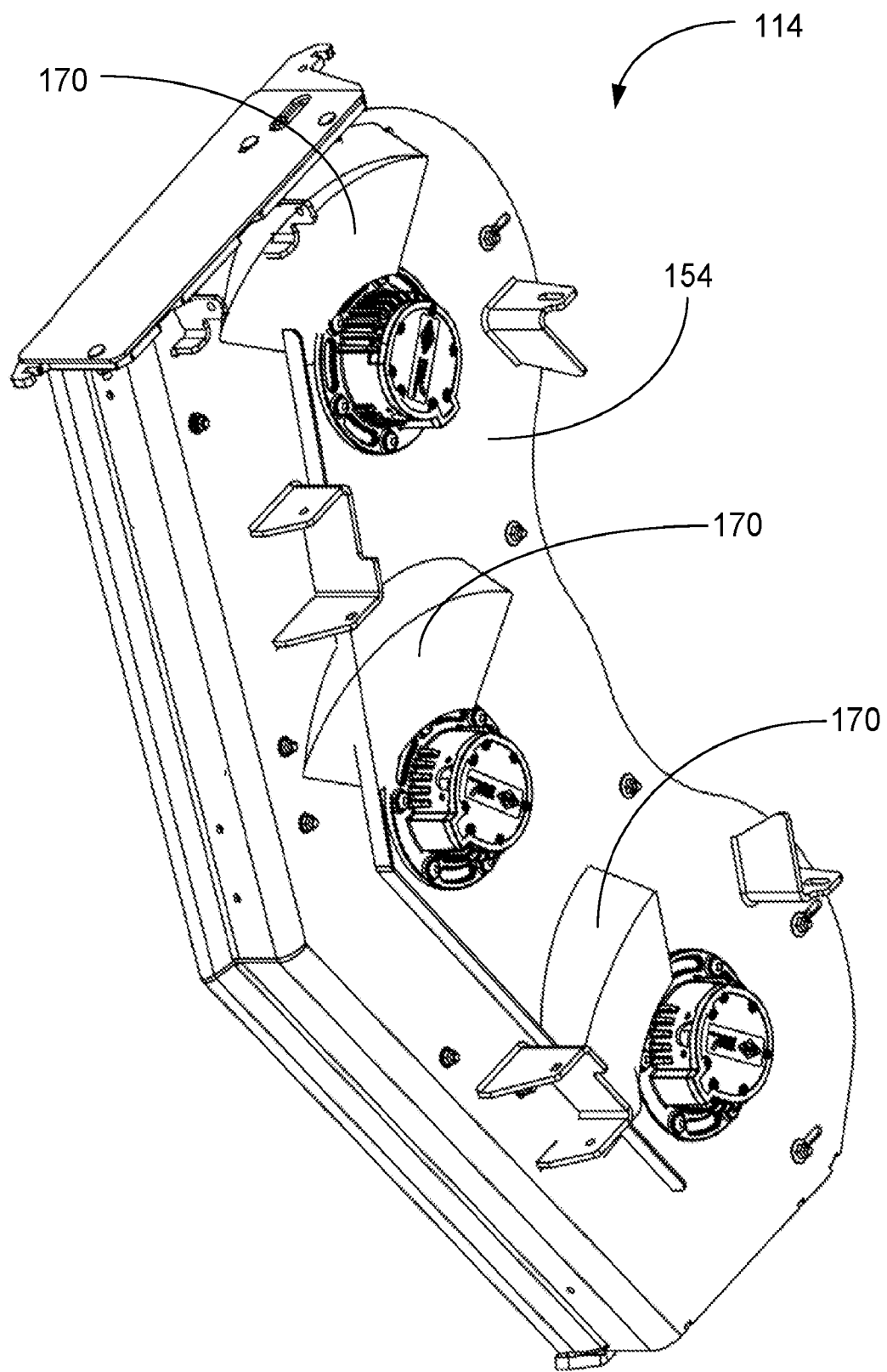
FIG. 8B is an isolated top perspective view of the implement of FIG. 8A.

Furthermore, in one or more embodiments, the kick-down baffle 170 may extend through the upper plate 154 such that a user may access and pivot the kick-down baffle 170. For example, as shown in FIG. 7B, the kick-down baffle 170 may be flush with the upper plate 154 from the top of the implement deck 114 (e.g., because the kick-down baffle 170 is extending into the cavity of the implement 114). Further, as shown in FIG. 8B, the kick-down baffle 170 may extend upward from the upper plate 154 (e.g., because the kick-down baffle 170 is flush with the upper plate 154 within the cavity of the implement 114). Because the kick-down baffle 170 extends through the upper plate 154, the kick-down baffle 170 may include a lever or be operatively coupled to an actuator to pivot the kick-down baffle 170 into the desired position. In other embodiments, the kick-down baffle 170 may be controlled manually or remotely even though the kick-down baffle 170 does not extend through the upper plate 154. Due to the lack of belts and pulleys located on top of the upper plate 154, there may be more room for the kick-down baffles 170 and the corresponding actuators.

In one or more embodiments, the kick-down baffle 170 may be adapted to rotate about a circular path concentric to a cutting blade axis 109 of the corresponding cutting blade 112 and located between 3.7 inches (e.g., inner radius) to 8.9 inches (e.g., outer radius) away from the cutting blade axis 109. The kick-down baffle 170 may be adapted to rotate such that the kick-down baffle 170 is located at the optimal position within the cavity of the implement 114. For example, the kick-down baffle 170 may be configured to move such that grass is thrown where desired and prevents clumping.

Additionally, as described above as it pertains to the rake angle and adjustable baffle, the mower may include one or more actuators 150 to remotely control the kick-down baffles 170 (e.g., as schematically shown in FIG. 7A). For example, the one or more controllers 152 may be adapted to move the kick-down baffles 170 via the one or more actuators 150 to directly move the kick-down baffles 170 or automatically move the kick-down baffles 170 in response to other inputs or data.

Figure 10:
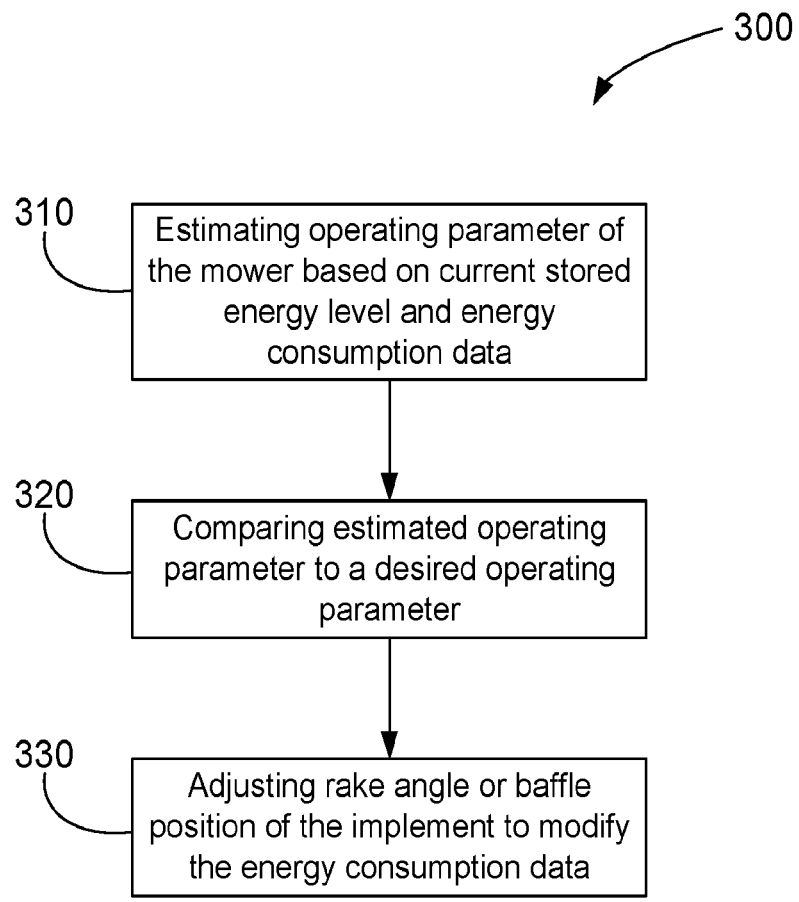
FIG. 10 is a flow diagram of a method of optimizing runtime of a ground working vehicle.

Therefore, the implement 114 of the mower 100 may be adjusted in various ways described herein (e.g., rake angle, rear baffle, kick-down baffles, etc.) to optimize an operating parameter of the mower 100. For example, as shown in FIG. 10, a method 300 of optimizing may include estimating 310 an operating parameter (e.g., runtime, quality of cut, etc.) of the mower based on a current stored energy level and energy consumption data (e.g., the amount of power being consumed). In other words, the one or more controllers may evaluate the present amount of energy within the mower (e.g., amount of remaining available gas or battery power) and the expected rate of energy consumption. Next, the method may include comparing 320 the estimated operating parameter to a desired operating parameter. In other words, the estimated operating parameter may be compared to the desired operating parameter to determine whether the mower has enough energy at the current energy consumption rate to perform for the desired amount of time or for the desired quality of cut. Thereafter, the method may include adjusting 330 the implement deck to modify the energy consumption data. The implement deck may be adjusted by changing the rake angle of the implement deck, changing the baffle position of the implement deck, and/or changing the position of the kick-down baffle.

Regardless of whether the estimated operating parameter of the mower is less than or greater than the desired operating parameter, components of the implement deck may be adjusted to optimize the runtime and the quality of cut. For example, if the estimated runtime is greater than the desired runtime, the implement deck may be adjusted to decrease the estimated runtime because that adjustment may improve the quality of cut. Also, for example, if the estimated runtime is less than the desired runtime, the implement deck may be adjusted to increase the estimated runtime, although this may worsen the quality of cut. In other words, it may be desirable to modify the energy consumption data to exactly equate the estimated runtime with the desired runtime (e.g., such that when the desired runtime is achieved, the energy source is almost depleted).

Furthermore, the energy consumption data may include a variety of different things that are analyzed to determine the expected operating parameter (e.g., runtime, quality of cut, etc.) of the mower. For example, the energy consumption data may include real time data (e.g., torque on a cutting blade motor of the mower, energy being consumed throughout use, etc.), historical data, predicted data, traction drive data, spatial data (e.g., geo-spatial data), battery health data (e.g., how much energy is delivered per charge cycle as the battery ages), ambient temperature while charging a battery, ambient temperature as the battery is being discharged, type of implement tool or cutting blade, etc. Specifically, in one or more embodiments, the energy consumption data may follow a linear consumption curve or a non-linear consumption curve (e.g., using spatial and/or temporal, historical data).

In one or more embodiments, the energy utilization of the mower may be mapped over the course of the day and a non-linear energy utilization may be developed therefrom. Further, the energy utilization curve (e.g., historical data) may be organized and utilized in a variety of different ways.

For example, the estimated utilization curve may be developed by statistically combining one or more of the previous days data. Also, in some embodiments, the estimated utilization curve may take into consideration day-of-the-week or month data. Further, in some embodiments, the estimated utilization curve may consider the number of days between mowing. Multiple factors (e.g., battery health, ambient temperature, time charging) can affect the amount of energy that can be stored in a battery during a charge cycle. These parameters also affect the rate at which the battery can be discharged safely.

In one or more embodiments, the energy utilization curve may also include a spatial component. For example, the energy utilization curve may be associated with a specific property using Global Positioning System (GPS) or a property address (e.g., using geo-spatial data). The properties may be organized into routes that are to be completed between charging. Further, routes may be organized into properties or sub-properties with different mowing frequencies. For example, the type "A" properties on a given route may be mowed half as often as type "B" properties or, the backyard of a given property may be mowed half as often as the front. Additionally, the required cut quality may differ between properties and/or locations on a given property (e.g., front yard and backyard).

Also, in one or more embodiments, the energy utilization curve may include traction drive data. For example, the traction drive data may account for the demand on the vehicle based on different types of terrain. Specifically, in one or more embodiments, some properties may be relatively flat and others may be relatively hilly. The power demand on the traction drive may be greater when climbing hills as compared to flat terrain. Also, different styles of the operator may affect the rate of power consumption (e.g., quick starts and stops).

The one or more controllers described herein may utilize the energy consumption data to determine the expected operating parameter (e.g., runtime, quality of cut, etc.) of the mower for the present application. The one or more controllers may also be adapted to move the implement deck, in response to the energy consumption data, via the one or more actuators. For example, in one or more embodiments, the one or more controllers may determine that the expected operating parameter of the mower may change by adjusting the rake angle of the implement deck. Therefore, the one or more controllers may instruct the one or more actuators to adjust the rake angle of the implement deck accordingly. Further, in one or more embodiments, the mower may include one or more sensors adapted to determine the amount of power demand and the position of the one or more actuators. As such, the one or more controllers may be aware of the exact position of the implement deck and how the implement deck is being adjusted. Also, the one or more sensors may be adapted to measure the torque load on the cutting blade motors during the current application by sensing the power demand.

The exemplary controller may include a processor that receives various inputs and executes one or more computer programs or applications stored in memory. The memory may include computer-readable instructions or applications that, when executed, e.g., by the processor, cause the controller to perform various calculations and/or issue commands. That is to say, the processor and memory may together define a computing apparatus operable to process input data and generate the desired output to one or more components/devices.

In view of the above, it will be readily apparent that the functionality of the controller may be implemented in any manner known to one skilled in the art. For instance, the memory may include any volatile, non-volatile, magnetic, optical, and/or electrical media, such as a random-access memory (RAM), read-only memory (ROM), non-volatile RAM (NVRAM), electrically-erasable programmable ROM (EEPROM), flash memory, and/or any other digital media. While the memory and processor may be incorporated into the controller, the memory and the processor could be contained in separate modules.

The processor may include any one or more of a microprocessor, a controller, a digital signal processor (DSP), an application specific integrated circuit (ASIC), a field-programmable gate array (FPGA), and/or equivalent discrete or integrated logic circuitry. In some embodiments, the processor may include multiple components, such as any combination of one or more microprocessors, one or more controllers, one or more DSPs, one or more ASICs, and/or one or more FPGAs, as well as other discrete or integrated logic circuitry. The functions attributed to the controller/processor herein may be embodied as software, firmware, hardware, or any combination thereof.

ILLUSTRATIVE EMBODIMENTS

A1. A ground working vehicle comprising:
a vehicle frame;
an implement coupled to the vehicle frame and extending between a first implement end and a second implement end along a longitudinal axis;
an implement angle selection tool configured to change an elevation of the second implement end relative to the first implement end and fix the elevation of the second implement end relative to the first implement end, wherein the implement angle selection tool comprises:
an angle lever pivotally attached to the vehicle frame and connected to a portion of the implement proximate the second implement end, wherein the angle lever is configured to be pivoted to adjust the elevation of the second implement end relative to the first implement end, and
a stopper positionable proximate the angle lever to restrict pivoting movement of the angle lever in at least one rotational direction; and
a height selection tool configured to select one vertical position of a plurality of selectable vertical positions, wherein each vertical position limits a distance between the implement and a ground surface, wherein the elevation of the second implement end relative to the first implement end is maintained at each of the vertical positions.

A2. The ground working vehicle according to embodiment A1, wherein the stopper is configured to position the angle lever at an angle relative to the vehicle frame, wherein the elevation of the second implement end relative to the first implement end varies depending on the angle of the angle lever.

A3. The ground working vehicle according to any preceding A embodiment, wherein the stopper is configured to be positioned at a plurality of different locations to restrict pivoting of the angle lever, wherein each different location of the plurality of locations is associated with a different elevation of the second implement end relative to the first implement end.

A4. The ground working vehicle according to any preceding A embodiment, wherein the angle lever is configured to pivot upwards to raise the second implement end relative to the first implement end and the angle lever is configured to pivot downwards to lower the second implement end relative to the first implement end, wherein the stopper is positioned below the angle lever to restrict downward pivoting of the angle lever due to weight of the implement attached to the angle lever.

A5. The ground working vehicle according to any preceding A embodiment, wherein the implement angle selection tool further comprises a plate defining a plurality of holes and the stopper comprises a pin, wherein the pin is configured to be inserted into a hole of the plurality of holes to maintain the angle lever at an elevation of the second implement end relative to the first implement end.

A6. The ground working vehicle according embodiment A5, wherein the implement angle selection tool further comprises an additional plate defining a plurality of holes that align with and correspond to the plurality of holes of the plate, wherein the pin is configured to be inserted through corresponding holes of the pluralities of holes of the additional plate.

A7. The ground working vehicle according to embodiment A6, wherein the angle lever is configured to rest on the pin between the plate and the additional plate.

A8. The ground working vehicle according to any preceding A embodiment, wherein the stopper is positioned below the angle lever such that the stopper restricts downward movement of the angle lever and allows upward movement of the angle lever.

A9. The ground working vehicle according to any preceding A embodiment, wherein the angle lever pivots about a lever pivot axis that is perpendicular to the longitudinal axis.

A10. The ground working vehicle according to any preceding A embodiment, wherein the height selection tool comprises a first implement end plate connected to the first implement end and pivotally attached to the vehicle frame and a second implement end plate connected to the second implement end and pivotally attached to the vehicle frame, wherein the first implement end plate is coupled to the second implement end plate via a link such that the first and second implement end plates pivot together to equally adjust the first and second implement ends, wherein the link defines a fixed length.

A11. The ground working vehicle according to embodiment A10, wherein the angle lever pivots relative to the second implement end plate.

A12. The ground working vehicle according to any preceding A embodiment, wherein the angle lever extends between a first lever end and a second lever end, wherein the first lever end is pivotally attached to the vehicle frame and the second lever end comprises a handle configured to be gripped by a user, wherein the implement is connected to the angle lever between the first and second lever ends.

A13. The ground working vehicle according to any preceding A embodiment, wherein the angle lever is connected to the portion of the implement proximate the second implement end via a chain.

A14. The ground working vehicle according to any preceding A embodiment, wherein the implement comprises a plurality of cutting blades.

B1. A ground working vehicle comprising:
a vehicle frame; and
an implement coupled to the vehicle frame and extending between a first implement end and a second implement end along a longitudinal axis, wherein the implement comprises a housing defining a chamber, wherein the housing comprises an upper plate and a baffle extending from the upper plate proximate the second implement end, wherein the baffle comprises a first plate movably coupled to the upper plate and a second plate movably coupled to the first plate,
wherein at least one of:
the first plate is configured to move relative to the upper plate along a direction parallel to the longitudinal axis, and
the second plate is configured to move relative to the first plate along a direction perpendicular to the longitudinal axis.

B2. The ground working vehicle according to any preceding B embodiment, wherein one or both of the upper plate and the first plate define one or more horizontal slots aligned along the longitudinal axis, wherein the first plate moves relative to the upper plate via the one or more horizontal slots.

B3. The ground working vehicle according to any preceding B embodiment, wherein one or both of the first plate and the second plate define one or more vertical slots aligned perpendicular to the longitudinal axis, wherein the second plate moves relative to the first plate via the one or more vertical slots.

B4. The ground working vehicle according to any preceding B embodiment, wherein the implement comprises a plurality of cutting blades disposed within the housing, wherein the first plate is configured to move relative to the upper plate such that a minimum distance between a portion of the first plate and a blade tip circle of the plurality of cutting blades ranges from 0 inches to 1.5 inches.

B5. The ground working vehicle according to any preceding B embodiment, wherein the second plate is configured to move relative to the first plate such that a minimum distance between the second plate and a ground surface ranges from 0.875 inches to 5.125 inches.

B6. The ground working vehicle according to any preceding B embodiment, further comprising one or more actuators configured to move one or both of the first plate relative to the upper plate and the second plate relative to the first plate.

C1. A ground working vehicle comprising:
a vehicle frame;
an implement coupled to the vehicle frame and extending between a first implement end and a second implement end along a longitudinal axis, wherein the implement comprises a housing defining a chamber, wherein the housing comprises an upper plate and a baffle extending from the upper plate proximate the second implement end;
a plurality of cutting blades disposed within the housing; and
a controller configured to do one or more of the following based on a torque of the plurality of cutting blades:
automatically adjust an elevation of the second implement end relative to the first implement end,
automatically adjust a minimum distance between the baffle and a blade tip circle of the plurality of cutting blades, and
automatically adjust a minimum distance between the baffle and a ground surface.

C2. The ground working vehicle according to any preceding C embodiment, wherein the elevation of the second implement end automatically increases relative to the first implement end when the torque of the plurality of cutting blades increases.

C3. The ground working vehicle according to any preceding C embodiment, wherein the elevation of the second implement end automatically decreases relative to the first implement end when the torque of the plurality of cutting blades decreases.

C4. The ground working vehicle according to any preceding C embodiment, wherein the minimum distance between the baffle and the blade tip circle of the plurality of cutting blades increases when the torque of the plurality of cutting blades increases.

C5. The ground working vehicle according to any preceding C embodiment, wherein the minimum distance between the baffle and the blade tip circle of the plurality of cutting blades decreases when the torque of the plurality of cutting blades decreases.

C6. The ground working vehicle according to any preceding C embodiment, wherein the minimum distance between the baffle and the ground surfaces increases when the torque of the plurality of cutting blades increases.

C7. The ground working vehicle according to any preceding C embodiment, wherein the minimum distance between the baffle and the ground surface decreases when the torque of the plurality of cutting blades decreases.

C8. The ground working vehicle according to any preceding C embodiment, further comprising one or more actuators configured to move the baffle relative to the upper plate.

D1. A ground working vehicle comprising:
a vehicle frame;
an implement coupled to the vehicle frame and extending between a first implement end and a second implement end along a longitudinal axis, wherein the implement comprises a housing defining a chamber, wherein the housing comprises an upper plate;
a plurality of cutting blades disposed within the housing; and
one or more kick-down baffles, wherein each kick-down baffle of the one or more kick-down baffles corresponds to a cutting blade of the plurality of cutting blades, wherein the kick-down baffle is adapted to pivot to a position between the corresponding cutting blade and the upper plate.

D2. The ground working vehicle according to any preceding D embodiment, wherein the kick-down baffle pivots about an axis that extends along a radial line from a cutting blade axis of the corresponding cutting blade.

D3. The ground working vehicle according to any preceding D embodiment, wherein the kick-down baffle defines a wedge shape, wherein an edge of the wedge shape pivots about an axis within a plane of the upper plate.

D4. The ground working vehicle according to any preceding D embodiment, wherein the kick-down baffle extends between an angle relative to the upper plate of about 0 degrees and 23 degrees.

D5. The ground working vehicle according to any preceding D embodiment, wherein the kick-down baffle is adapted to rotate about a circular path concentric to a cutting blade axis of the corresponding cutting blade and located 3.7 inches away from the cutting blade axis.

E1. A method of optimizing an operating parameter of a ground working vehicle, the method comprising:
estimating the operating parameter of the ground working vehicle based on a current stored energy level and energy consumption data, the ground working vehicle comprising a vehicle frame and an implement coupled to the vehicle frame, wherein the implement extends between a first implement end and a second implement end along a longitudinal axis;
comparing estimated operating parameter to a desired operating parameter; and
adjusting rake angle of the implement or baffle position of the implement to modify the energy consumption data, wherein the rake angle is defined by an elevation of the second implement end relative to the first implement end, wherein the baffle is located proximate the second implement end.

E2. The method according to any preceding E embodiment, wherein the operating parameter comprises runtime or quality of cut.

E3. The method according to any preceding E embodiment, further comprising modifying the energy consumption data to exactly equate the estimated operating parameter with the desired operating parameter.

E4. The method according to any preceding E embodiment, wherein the energy consumption data is selected from the group consisting of real time data, historical data, predicted data, traction drive data, and spatial data.

E5. The method according to embodiment E4, wherein the real time data comprises torque on a cutting blade motor of the ground working vehicle.

E6. The method according to any preceding E embodiment, wherein the ground working vehicle comprises one or more actuators adapted to adjust the rake angle or baffle position.

E7. The method according to embodiment E6, wherein the ground working vehicle comprises one or more sensors adapted to determine the amount of power and position of the one or more actuators.

F1. A ground working vehicle comprising:
a vehicle frame;
an implement coupled to the vehicle frame and extending between a first implement end and a second implement end along a longitudinal axis;
one or more actuators adapted to:
change an elevation of the second implement end relative to the first implement end and fix the elevation of the second implement end relative to the first implement end, and/or
change the position of a baffle of the implement; and
a controller adapted to:
estimate runtime of the ground working vehicle based on a current stored energy level and energy consumption data,
compare estimate runtime to a desired runtime, and
adjust one or both of:
the elevation of the second implement end relative to the first implement end via the one or more actuators to modify the energy consumption data, and
the baffle position of the implement.

F2. The ground working vehicle according to any preceding F embodiment, wherein the ground working vehicle comprises an electric motor.

F3. The ground working vehicle according to any preceding F embodiment, wherein the ground working vehicle comprises an internal combustion engine.

F4. The ground working vehicle according to any preceding F embodiment, wherein the controller is operatively coupled to one or more sensors, wherein the controller is further adapted to receive a power demand and the elevation of the second implement end relative to the first implement end via the one or more sensors.

The complete disclosure of the patents, patent documents, and publications cited herein are incorporated by reference in their entirety as if each were individually incorporated. In the event that any inconsistency exists between the disclosure of the present application and the disclosure(s) of any document incorporated herein by reference, the disclosure of the present application shall govern.

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. A method of optimizing an operating parameter of a ground working vehicle, the method comprising:
   estimating, with a controller of the ground working vehicle, the operating parameter of the ground working vehicle based on a current stored energy level and energy consumption data, the ground working vehicle comprising:
   a vehicle frame and an implement coupled to the vehicle frame, wherein the implement extends between a first implement end and a second implement end along a longitudinal axis; and
   one or more actuators adapted to: change an elevation of the second implement end relative to the first implement end and fix the elevation of the second implement end relative to the first implement end;
   and/or change a position of a baffle of the implement;
      comparing, with the controller, the estimated operating parameter to a desired operating parameter; and
      adjusting with the one or more actuators a rake angle of the implement or the baffle position of the implement to modify the energy consumption data, wherein the rake angle is defined by the elevation of the second implement end relative to the first implement end, and wherein the baffle is located proximate the second implement end.

2. The method of claim 1, wherein the implement comprises a cutting deck and wherein the operating parameter comprises runtime of the ground working vehicle or quality of cut produced by the cutting deck.

3. The method of claim 1, further comprising modifying the energy consumption data to exactly equate the estimated operating parameter with the desired operating parameter.

4. The method of claim 1, wherein the energy consumption data is selected from the group consisting of real time data, historical data, predicted data, traction drive data, and spatial data.

5. The method of claim 4, wherein the real time data comprises torque on a cutting blade motor of the ground working vehicle.

6. The method of claim 1, wherein the ground working vehicle comprises one or more sensors adapted to determine an amount of power being consumed and a position of the one or more actuators.

7. A ground working vehicle comprising:
   a vehicle frame;
      an implement coupled to the vehicle frame and extending between a first implement end and a second implement end along a longitudinal axis;
      one or more actuators adapted to:
   change an elevation of the second implement end relative to the first implement end and fix the elevation of the second implement end relative to the first implement end, and/or
   change the position of a baffle of the implement; and
   a controller adapted to:
   estimate runtime of the ground working vehicle based on a current stored energy level and energy consumption data,
   compare the estimated runtime to a desired runtime, and adjust one or both of:
   the elevation of the second implement end relative to the first implement end via the one or more actuators to modify the energy consumption data to equate the estimated runtime with the desired runtime, and
   the baffle position of the implement.

8. The ground working vehicle of claim 7, wherein the ground working vehicle comprises an electric motor.

9. The ground working vehicle of claim 7, wherein the ground working vehicle comprises an internal combustion engine.

10. The ground working vehicle of claim 7, wherein the controller is operatively coupled to one or more sensors, wherein the controller is further adapted to receive a power demand and the elevation of the second implement end relative to the first implement end via the one or more sensors.

11. The ground working vehicle of claim 7, wherein the implement comprises a cutting deck.

12. The ground working vehicle of claim 7, wherein the energy consumption data is selected from the group consisting of real time data, historical data, predicted data, traction drive data, and spatial data.

13. The ground working vehicle of claim 7, wherein the ground working vehicle further comprises one or more sensors adapted to determine a position of the one or more actuators.

* * * * *